United States Patent
McIntyre et al.

(10) Patent No.: US 11,679,744 B2
(45) Date of Patent: *Jun. 20, 2023

(54) INFLATOR WITH DYNAMIC PRESSURE COMPENSATION

(71) Applicant: MILWAUKEE ELECTRIC TOOL CORPORATION, Brookfield, WI (US)

(72) Inventors: Joseph R. McIntyre, Milwaukee, WI (US); Huang Yan Jian, Dongguan (CN); Xu Wen Chao, Dongguan (CN); Dan Jun Guo, Dongguan (CN); Jonathan M. Mantes, Franklin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,026

(22) Filed: Mar. 19, 2021

(65) Prior Publication Data

US 2021/0206354 A1 Jul. 8, 2021

Related U.S. Application Data

(63) Continuation of application No. 16/280,689, filed on Feb. 20, 2019, now Pat. No. 10,974,701.

(30) Foreign Application Priority Data

Feb. 28, 2018 (CN) .......................... 201810169213.5

(51) Int. Cl.
*B60S 5/04* (2006.01)
*F04B 49/08* (2006.01)
(Continued)

(52) U.S. Cl.
CPC .............. *B60S 5/046* (2013.01); *F04B 35/04* (2013.01); *F04B 35/06* (2013.01); *F04B 49/065* (2013.01);
(Continued)

(58) Field of Classification Search
USPC ........................................................ 700/282
See application file for complete search history.

(56) References Cited

U.S. PATENT DOCUMENTS 1,566,620 A 12/1925 Scoville, Jr.
2,453,402 A 11/1948 Bell
(Continued)

FOREIGN PATENT DOCUMENTS

CN 101932831 B 6/2014
CN 204253309 U * 4/2015
(Continued)

OTHER PUBLICATIONS

Extended European Search Report for Application No. 21152357.6 dated Oct. 11, 2021 (9 pages).

*Primary Examiner* — Emilio J Saavedra
(74) *Attorney, Agent, or Firm* — Michael Best & Friedrich LLP

(57) ABSTRACT

An inflator includes an inflator housing, a pressure sensor operable to generate a pressure signal related to an outlet pressure of the inflator, a motor within the inflator housing, a battery pack removably coupleable to the inflator housing, and a controller electrically coupled to the motor and the battery pack. The controller is configured to receive the pressure signal from the pressure sensor, determine a rate of pressurization change based on the pressure signal, determine a static pressure value based on the rate of pressurization change, and determine a motor time delay based on a target pressure value, the static pressure value, and the rate (Continued)

of pressurization change. The controller is also configured to generate a control signal when the motor time delay substantially equals zero. The control signal is operable to cause power to the motor to be turned off to stop a pressurization condition of the inflator.

20 Claims, 17 Drawing Sheets

(51) Int. Cl.
  *G05B 15/02* (2006.01)
  *F04B 35/04* (2006.01)
  *F04B 49/06* (2006.01)
  *F04B 35/06* (2006.01)

(52) U.S. Cl.
  CPC .............. *F04B 49/08* (2013.01); *G05B 15/02* (2013.01); *F04B 2205/04* (2013.01); *F04B 2207/03* (2013.01); *F04B 2207/043* (2013.01)

(56) References Cited

U.S. PATENT DOCUMENTS

| | | | |
|---|---|---|---|
| 4,333,491 A | 6/1982 | Knubley | |
| 4,389,166 A | 6/1983 | Harvey et al. | |
| 4,418,737 A | 12/1983 | Goodell et al. | |
| 4,431,043 A | 2/1984 | Goodell et al. | |
| 4,440,451 A | 4/1984 | Goodell et al. | |
| 4,456,038 A | 6/1984 | Gwaltney et al. | |
| 4,470,506 A | 9/1984 | Goodell et al. | |
| 4,558,994 A | 12/1985 | Viola et al. | |
| 4,614,479 A | 9/1986 | Liu | |
| 4,694,409 A | 9/1987 | Lehman | |
| 4,776,766 A | 10/1988 | Brent | |
| 4,898,216 A | 2/1990 | Schultz et al. | |
| 5,012,954 A | 5/1991 | Will | |
| 5,125,800 A | 6/1992 | Wong | |
| 5,127,808 A | 7/1992 | Nichols et al. | |
| 5,163,818 A | 11/1992 | Betsill et al. | |
| 5,249,609 A | 10/1993 | Walker et al. | |
| 5,409,045 A | 4/1995 | Walker et al. | |
| 5,540,268 A | 7/1996 | Mittal | |
| 5,587,698 A | 12/1996 | Genna | |
| 5,629,873 A | 5/1997 | Mittal et al. | |
| 5,629,874 A | 5/1997 | Mittal et al. | |
| 5,931,207 A | 8/1999 | Gianino | |
| 6,067,850 A | 5/2000 | Lang et al. | |
| 6,095,762 A | 8/2000 | Wheeler | |
| 6,293,147 B1 | 9/2001 | Parker et al. | |
| D454,884 S | 3/2002 | Christiansen et al. | |
| 6,439,104 B1 | 8/2002 | Tonogai et al. | |
| 6,468,047 B1 | 10/2002 | Huang et al. | |
| 6,558,135 B1 | 5/2003 | Wood | |
| 6,561,017 B1 | 5/2003 | Claussen et al. | |
| 6,705,360 B1 * | 3/2004 | Bonzer | B60S 5/046 417/313 |
| D500,326 S | 12/2004 | Fathallah et al. | |
| 6,838,983 B1 | 1/2005 | Wong | |
| 6,857,311 B2 | 2/2005 | Gonzaga | |
| 6,865,930 B1 | 3/2005 | Claussen et al. | |
| D516,090 S | 2/2006 | Gist et al. | |
| 7,032,611 B1 | 4/2006 | Sheng | |
| 7,331,221 B2 | 2/2008 | Wise et al. | |
| 7,434,833 B2 | 10/2008 | Kore | |
| D589,985 S | 4/2009 | Steinfels | |
| 7,556,478 B2 | 7/2009 | Klein et al. | |
| D609,634 S | 2/2010 | Daniels et al. | |
| D612,403 S | 3/2010 | Picaza Ibarrondo | |
| 7,706,930 B2 | 4/2010 | Corniot | |
| 8,191,586 B2 | 6/2012 | Huval et al. | |
| D668,683 S | 10/2012 | Balma | |
| D700,626 S | 3/2014 | Zhangyan et al. | |
| 8,733,270 B2 | 5/2014 | Chen | |
| 8,887,769 B1 | 11/2014 | Ohm et al. | |
| D718,790 S | 12/2014 | Yang | |
| 9,057,656 B2 | 6/2015 | Chen | |
| D749,643 S | 2/2016 | Craig et al. | |
| 9,295,336 B2 | 3/2016 | Driscoll, Jr. et al. | |
| D754,755 S | 4/2016 | Suthmann | |
| 9,309,980 B2 | 4/2016 | Ward et al. | |
| D769,944 S | 10/2016 | Sheedy | |
| D774,554 S | 12/2016 | Imsand et al. | |
| D781,921 S | 3/2017 | Adachi et al. | |
| D792,472 S | 7/2017 | Kirkpatrick et al. | |
| D792,473 S | 7/2017 | Imsand et al. | |
| 9,860,361 B1 * | 1/2018 | Hall | H04W 4/80 |
| D811,324 S | 2/2018 | Inskeep | |
| 10,315,472 B2 * | 6/2019 | Paasch | B60S 5/04 |
| 10,837,433 B2 | 11/2020 | Walmsley et al. | |
| 11,206,928 B2 | 12/2021 | Dorshorst | |
| 2006/0002800 A1 * | 1/2006 | Klein | F04B 49/022 417/44.1 |
| 2008/0181794 A1 | 7/2008 | Steinfels et al. | |
| 2008/0199324 A1 | 8/2008 | Yang | |
| 2008/0266073 A1 | 10/2008 | Tu et al. | |
| 2012/0283984 A1 | 11/2012 | Peng | |
| 2014/0166118 A1 | 6/2014 | Stephens et al. | |
| 2017/0130728 A1 | 5/2017 | Liu | |
| 2018/0207575 A1 * | 7/2018 | Dunning | B60C 23/00354 |
| 2018/0372079 A1 | 12/2018 | Walmsley et al. | |
| 2019/0003468 A1 | 1/2019 | Walmsley et al. | |
| 2019/0070907 A1 * | 3/2019 | Dudar | F02B 39/10 |
| 2021/0075235 A1 | 3/2021 | Nook et al. | |
| 2021/0091578 A1 | 3/2021 | Miller et al. | |

FOREIGN PATENT DOCUMENTS

| | | |
|---|---|---|
| CN | 204253309 U | 4/2015 |
| CN | 207106463 U | 3/2018 |
| DE | 102011081682 A1 | 2/2013 |
| DE | 202014004811 U1 | 7/2014 |
| DE | 102013109215 A1 | 2/2015 |
| GB | 1599304 | 9/1981 |

* cited by examiner

INFLATOR WITH DYNAMIC PRESSURE COMPENSATION

RELATED APPLICATIONS

This application is a continuation of U.S. patent application Ser. No. 16/280,689, filed on Feb. 20, 2019, which claims the benefit of Chinese Patent Application No. 201810169213.5, filed Feb. 28, 2018.

FIELD OF THE INVENTION

The present invention relates to inflators.

BACKGROUND OF THE INVENTION

Many objects, such as vehicle tires, bicycle tires, sports balls, float tubes, and the like, must be filled with compressed air. Such objects may be filled with air using a variety of different filling devices, such a manual pump, a compressor, or a portable inflator. Typically, a user must monitor the pressure within the object to determine when a desired fill pressure has been reached. The user may monitor the pressure using a separate pressure gauge or a pressure gauge that is incorporated into the filling device.

SUMMARY OF THE INVENTION

The present invention provides, in one aspect, an inflator that includes an inflator housing, a pressure sensor, a motor within the inflator housing, a battery pack, and a controller. The pressure sensor is operable to generate a pressure signal related to a value of an outlet pressure of the inflator. The battery pack is removably coupleable to the inflator housing. The controller is electrically coupled to the motor and the battery pack. The controller includes a non-transitory computer readable medium and a processor. The controller comprises computer executable instructions stored in the computer readable medium for controlling operation of the inflator to receive the pressure signal from the pressure sensor, compare the value of the outlet pressure of the inflator from the pressure signal to a target pressure value, determine a rate of pressurization change based on the pressure signal when the value of the outlet pressure of the inflator is greater than or equal to the target pressure value, determine a motor time delay based on a pressure signal, the target pressure value, and the rate of pressurization change, and generate a control signal when the motor time delay substantially equals zero. The control signal is operable to cause power to the motor to be turned off to stop pressurization of the inflator.

The present invention provides, in another aspect, a computer-implemented method of controlling an inflator. The inflator includes a processor, a pressure sensor, a motor, and a battery pack. The method comprises receiving a pressure signal from the pressure sensor related to an outlet pressure of the inflator, comparing, using the processor, the value of the outlet pressure of the inflator from the pressure signal to a target pressure value, determining, using the processor, a rate of pressurization change based on the pressure signal when the value of the outlet pressure of the inflator is greater than or equal to the target pressure value, determining, using the processor, a motor time delay based on a pressure signal, the target pressure value, and the rate of pressurization change, and generating, using the processor, a control signal when the motor time delay substantially equals zero. The control signal is operable to cause power to the motor to be turned off to stop pressurization of the inflator.

The present invention provides, in another aspect, an inflator including an inflator housing and a motor within the inflator housing. The motor defines a motor axis and includes an output shaft that is rotatable about the motor axis. A battery pack is removably coupleable to the inflator housing, and the battery pack is configured to provide power to the motor at a nominal output voltage when coupled to the inflator housing. The inflator also includes a pump within the inflator housing and coupled to the output shaft. The pump includes a cylinder defining a cylinder axis and a piston that is reciprocable within the cylinder along the cylinder axis in response to rotation of the output shaft. The pump has a maximum flow rate between about 21,875 cubic centimeters per minute (cc/min) and about 63,000 cc/min.

The present invention provides, in another aspect, an inflator including an inflator housing, a pressure sensor operable to generate a pressure signal related to an outlet pressure of the inflator, a motor within the inflator housing, a battery pack removably coupleable to the inflator housing, and a controller electrically coupled to the motor and the battery pack. The controller includes a non-transitory computer readable medium and a processor. The controller comprises computer executable instructions stored in the computer readable medium for controlling operation of the inflator to receive the pressure signal from the pressure sensor, determine a rate of pressurization change based on the pressure signal, determine a static pressure value based on the rate of pressurization change, determine a motor time delay based on a target pressure value, the static pressure value, and the rate of pressurization change, and generate a control signal when the motor time delay substantially equals zero. The control signal is operable to cause power to the motor to be turned off to stop a pressurization condition of the inflator.

The present invention provides, in another aspect, a computer-implemented method of controlling an inflator that includes a processor, a pressure sensor, a motor, and a battery pack. The method includes receiving a pressure signal from the pressure sensor related to an outlet pressure of the inflator, determining a rate of pressurization change based on the pressure signal, and determining a static pressure value based on the rate of pressurization change. The method further includes determining a motor time delay based on a target pressure value, the static pressure value, and the rate of pressurization change, and generating a control signal when the motor time delay substantially equals zero to cause power from the battery pack to the motor to be turned off to stop a pressurization condition of the inflator.

The present invention provides, in another aspect, a method of inflating a vehicle tire having an internal volume between about 10 gallons and about 12 gallons. The method includes discharging compressed air into the internal volume with an inflator. The inflator has an inflator housing, a motor within the inflator housing defining a motor axis and including an output shaft rotatable about the motor axis, a DC power source configured to provide power to the motor at a nominal output voltage, and a pump within the inflator housing and coupled to the output shaft. The pump includes a cylinder defining a cylinder axis and a piston that is reciprocable within the cylinder along the cylinder axis in response to rotation of the output shaft. By discharging compressed air into the internal volume, increasing a static pressure of the internal volume by 5 pounds per square inch (psi) from a starting pressure in the internal volume between 28 psi and 31 psi occurs within 40 to 60 seconds.

The present invention provides, in another aspect, a method of inflating a vehicle tire having an internal volume between about 10 gallons and about 12 gallons. The method includes discharging compressed air into the internal volume with an inflator. The inflator has an inflator housing, a motor within the inflator housing defining a motor axis and including an output shaft rotatable about the motor axis, a DC power source configured to provide power to the motor at a nominal output voltage, and a pump within the inflator housing and coupled to the output shaft. The pump includes a cylinder defining a cylinder axis and a piston that is reciprocable within the cylinder along the cylinder axis in response to rotation of the output shaft. By discharging compressed air into the internal volume, increasing a static pressure of the internal volume by 15 pounds per square inch (psi) from a starting pressure in the internal volume of 25 psi occurs within 120 seconds.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
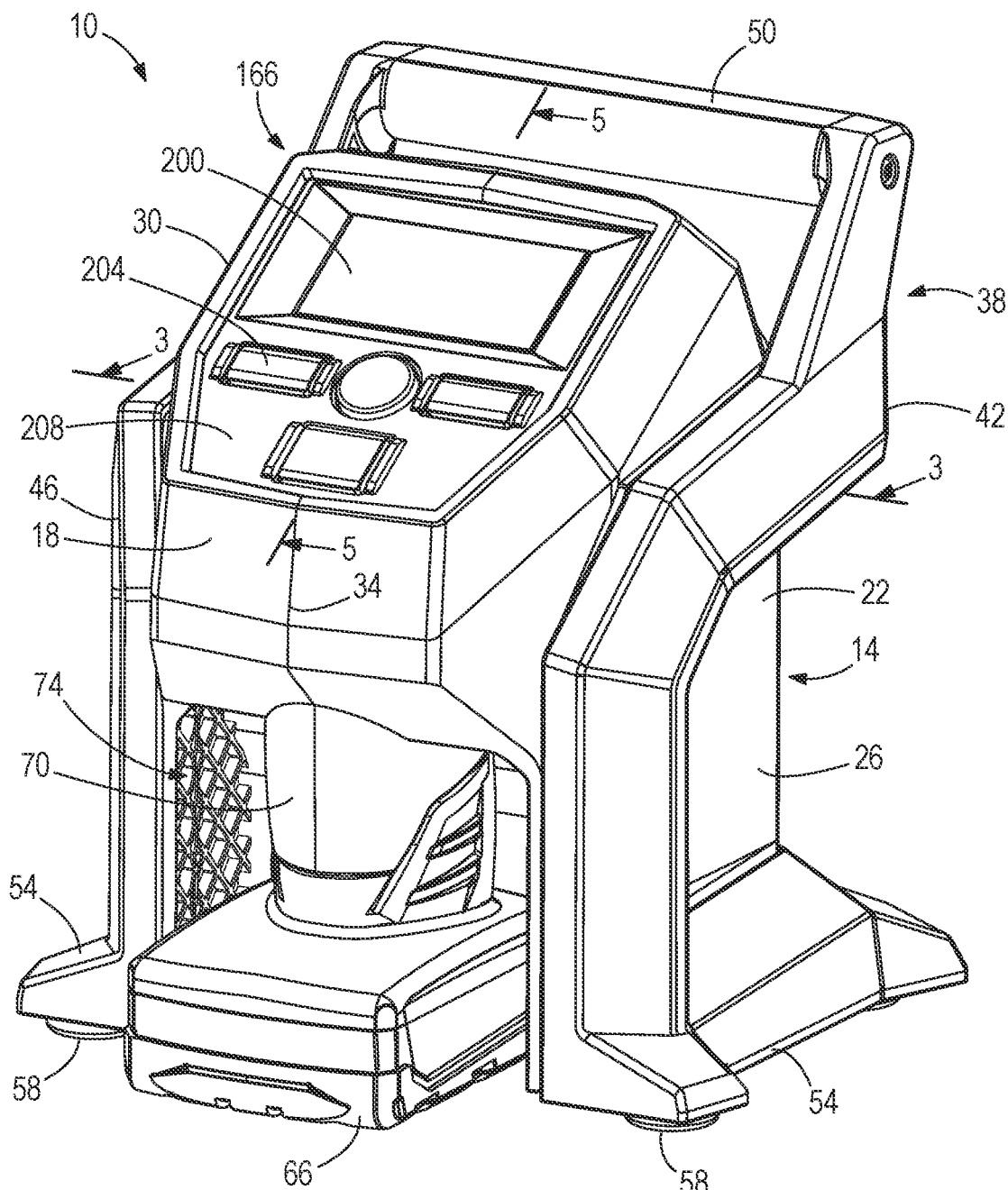
FIG. 1 is a perspective view of an inflator according to one embodiment of the invention.

FIGS. 1-5 illustrate a portable inflator 10 according to an embodiment of the invention. The inflator 10 includes an inflator housing 14 having a front side 18, a rear side 22, and left and right sides 26, 30 extending between the front side 18 and the rear side 22 (FIG. 1). The illustrated housing 14 is a clamshell housing defined by cooperating halves joined at a parting plane 34 that bisects the inflator 10. In other embodiments, the parting plane 34 may not bisect the inflator 10. Alternatively, the housing 14 may be a unitary structure, or may be formed in other ways.

In the illustrated embodiment, an external frame 38 is coupled to the outside of the housing 14. The frame 38 is preferably made from an impact-resistant material (e.g., a polycarbonate-ABS blend), and the frame's placement on the housing 14 may help protect the housing 14 from falls or other impacts. The illustrated frame 38 includes a first portion 42 extending along the left side 26 of the housing 14, a second portion 46 extending along the right side 30 of the housing 14, and a third portion 50 extending between the first and second portions 42, 46. The third portion 50 defines a handle that is spaced from the housing 14 and that can be gripped by a user to facilitate carrying and moving the inflator 10. In the illustrated embodiment, each of the first and second portions 42, 46 of the frame 38 further includes a base 54 extending in a front-rear direction along the left and right sides 26, 30 of the housing 14, respectively. Each base 54 includes a plurality of feet 58 (FIG. 2) that are engageable with a surface (not shown) when the inflator 10 is set upright (i.e. the orientation illustrated in FIG. 1) upon the surface. The feet 58 are preferably made of a resilient material (e.g., rubber or silicone) to dampen vibrations generated during operation of the inflator 10.

The inflator 10 further includes a motor 62 supported within the housing 14 (FIG. 3) and a battery 66 (FIG. 1) configured to provide power to the motor 62. The battery 66 is removably coupled to a battery receptacle 70, which is located at least partially within a battery recess 74 that extends inward from the front side 18 of the housing 14. The illustrated battery 66 is a power tool battery pack with a plurality of rechargeable battery cells (e.g., lithium-based battery cells; not shown) providing the battery 66 with a nominal output voltage of about 12V or less. In other embodiments, the battery 66 can have a different nominal voltage, such as, for example, 18V, 36V, or 40V. Alternatively, the inflator 10 may be a corded tool configured to receive power from a wall outlet or other remote power source, such as a lead acid battery.

Figure 3:
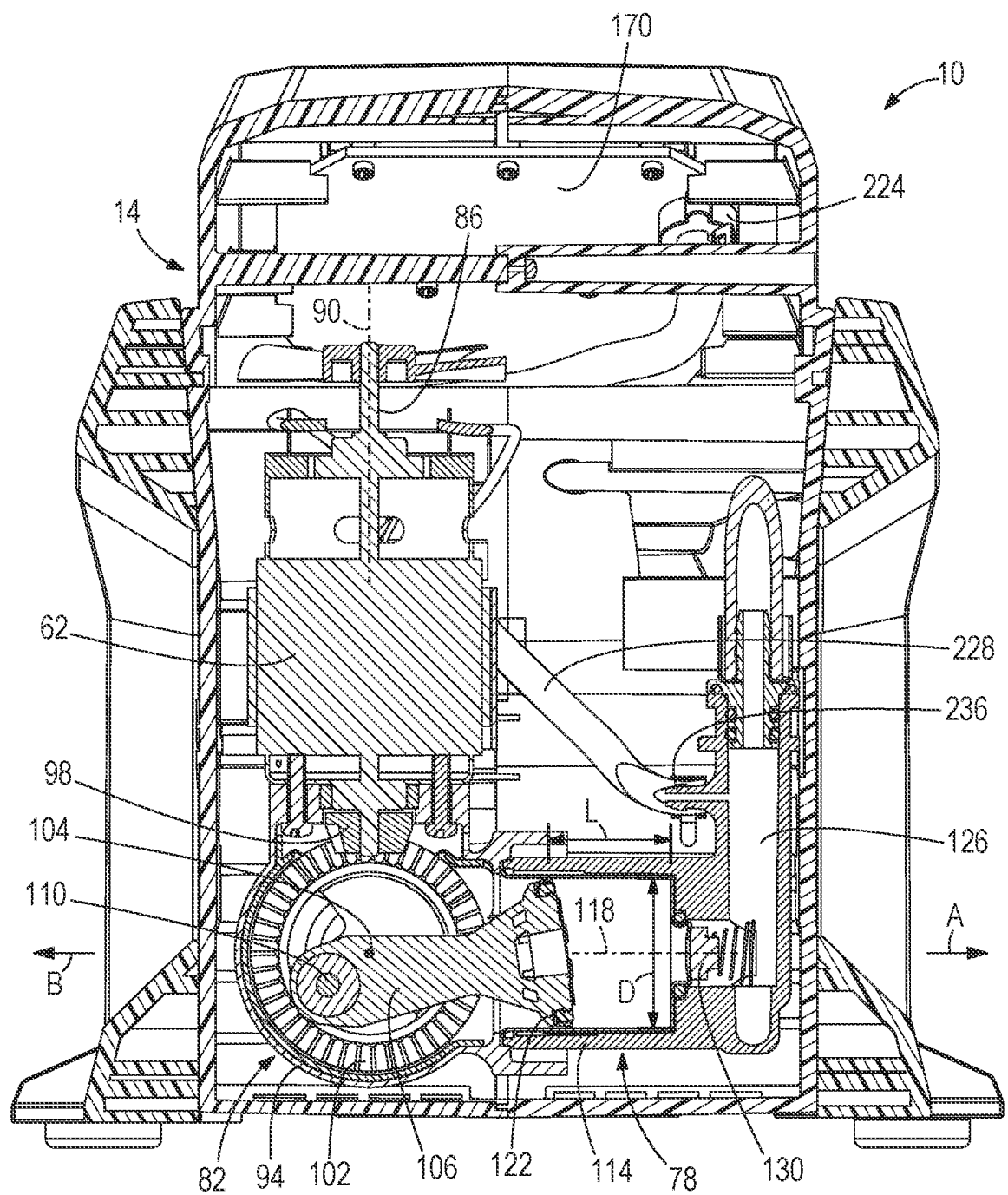
FIG. 3 is a cross-sectional view of the inflator of FIG. 1.

Referring to FIG. 3, the inflator 10 includes a pump 78 and a drive assembly 82 for providing torque from the motor 62 to the pump 78. The illustrated motor 62 is a DC electric motor and may be a brushed or brushless electric motor. The motor 62 includes an output shaft 86 defining a motor axis 90. The drive assembly 82 is at least partially housed within a gear case 94 and includes a pinion 98 fixed to the output shaft 86 for rotation about the motor axis 90, a bevel gear 102 meshed with the pinion 98 and rotatable about a gear axis 104 transverse to the motor axis 90, and a crank arm 106 coupled to the bevel gear 102 at an eccentric pivot 110 that is offset from the gear axis 104. The pump 78 includes a cylinder 114 defining a cylinder axis 118, that is transverse to both the motor axis 90 and the gear axis 104, and a piston 122 coupled to the crank arm 106. The piston 122 is reciprocable within the cylinder 114 along the cylinder axis 118 in response to rotation of the bevel gear 102.

In some embodiments, the cylinder 114 has an internal diameter, D, between about 23 millimeters (mm) and about 29 mm. In the illustrated embodiment, the internal diameter, D, is about 26 mm. In some embodiments, the piston 122 is movable along the cylinder axis 118 a stroke length, L, between about 15 mm and about 21 mm. In the illustrated embodiment, the stroke length, L, is about 18 mm. Accordingly, in the illustrated embodiment, the pump 78 has an internal cylinder diameter to stroke length ratio, D:L, of about 1.44.

Based on the internal diameter, D, of the cylinder 114 and the stroke length, L, of the piston 122, the pump 78 has a displacement per stroke, $Q_S$, that can be calculated as set forth below in EQN. 1:

$$Q_S = \frac{1}{4}D^2 \times L \times \pi \qquad \text{EQN. 1}$$

Accordingly, in some embodiments, the pump 78 has a displacement per stroke, $Q_S$, between about 6.25 cubic centimeters and about 14 cubic centimeters. In the illustrated embodiment, the pump 78 has a displacement per stroke, $Q_S$, of about 9.5 cubic centimeters.

In some embodiments, the bevel gear 102 can be driven by the motor 62 up to a maximum speed, N, between about 3500 revolutions per minute (RPM) and about 4500 RPM. In the illustrated embodiment, the bevel gear 102 can be driven by the motor 62 up to a maximum speed, N, of about 4000 RPM. The flow rate, Q, of the pump 78 can be calculated by multiplying the displacement per stroke, $Q_S$, by the rotational speed, N, of the bevel gear 102 as set forth below in EQN. 2:

$$Q = Q_S \times N \qquad \text{EQN. 2}$$

Accordingly, in some embodiments, the pump 78 has a flow rate, Q, between about 21,875 cubic centimeters per minute (cc/min) and about 63,000 cc/min at a discharge pressure of 0 psig. In some embodiments, the pump 78 has a flow rate, Q, of about 25,000 cc/min (or about 25 liters per minute) at a discharge pressure of 0 psig. With the battery 66 having a nominal output voltage of about 12V in some embodiments, the inflator 10 can therefore have a flow rate to battery voltage ratio, Q:V, between about 1,822 cc/min per volt and about 5,250 cc/min per volt in some embodiments. For example, the flow rate to battery voltage ratio Q:V may be about 2,083 cc/min per volt. The high flow rate, Q, and corresponding flow rate to battery voltage ratio Q:V of the inflator 10 advantageously allows the inflator 10 to quickly fill inflatable objects to a desired pressure.

For example, the inflator 10 may be used to fill pneumatic tires for vehicles. A typical tire for a passenger vehicle has an internal fillable volume between about 10 gallons and about 12 gallons. In some embodiments, the inflator 10 can increase the static pressure in a 10-12 gallon tire from 28-31 (or about 30) pounds per square inch (psi) to 35 psi in between 40 seconds and 60 seconds. In some embodiments, the inflator 10 can increase the static pressure in a 10-12 gallon tire from 28-31 pounds per square inch (psi) to 35 psi in between 40 seconds and 50 seconds. The inflator 10 was tested on a 245/45R19 vehicle tire having an internal volume of about 10.5 gallons. Using a battery with a nominal output voltage of 12 V, the inflator 10 filled the tire from a starting pressure of 25 psi to a static pressure of 40 psi in 119 seconds.

Figure 4:
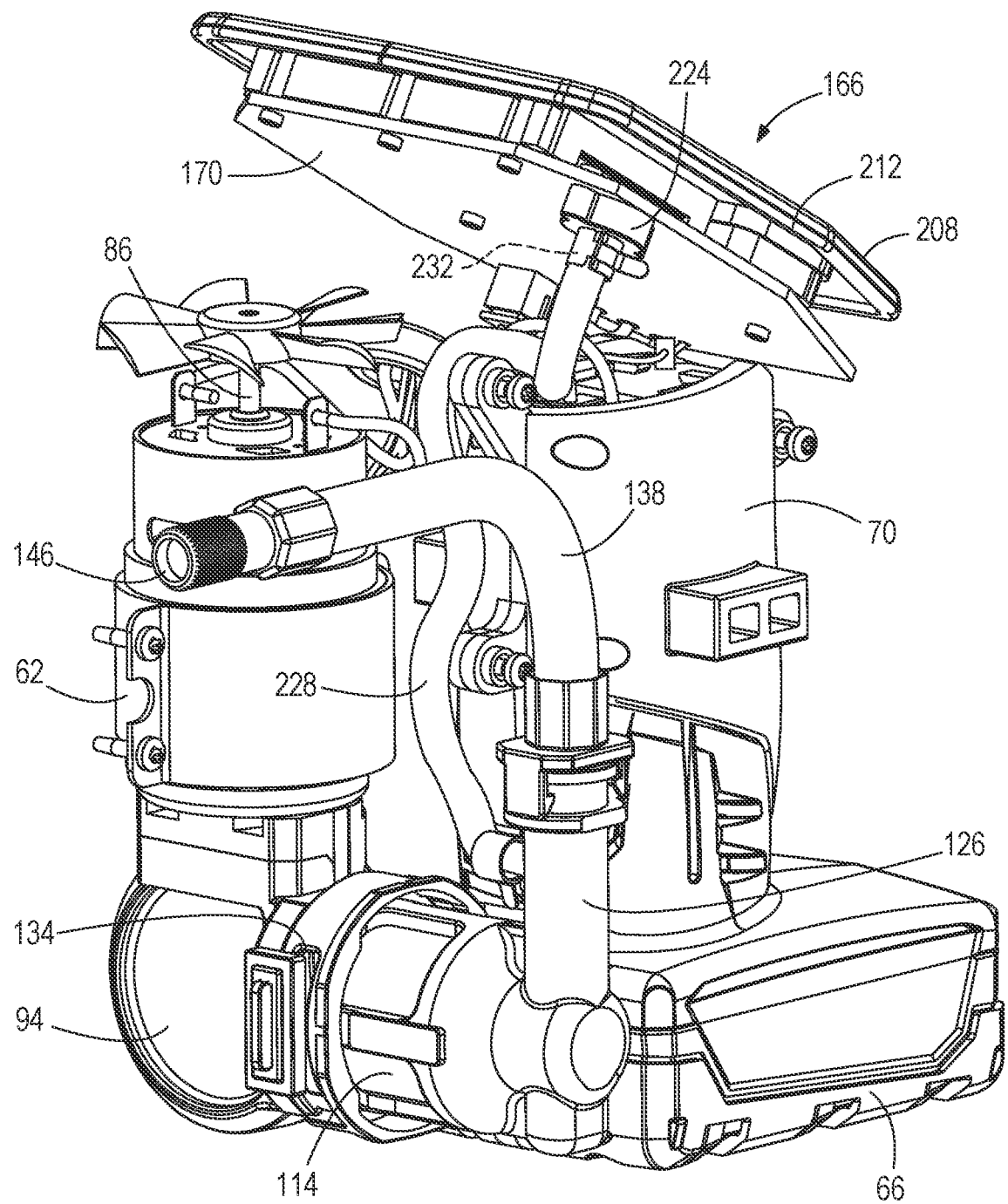
FIG. 4 is a perspective view of a portion of the inflator of FIG. 1.

Referring to FIG. 3, the pump 78 further includes an outlet chamber 126 and a one-way valve 130 disposed between the outlet chamber 126 and the cylinder 114. The illustrated valve 130 is a spring-biased poppet valve; however, any other suitable type of one-way valve may be used. The valve 130 is configured to open when pressure within the cylinder 114 exceeds a cracking pressure of the valve 130 (e.g., when the piston 122 moves in the direction of arrow A during its compression stroke). The valve 130 is configured to close when the piston 122 moves in the direction of arrow B during its return stroke so as to maintain an elevated pressure within the outlet chamber 126. An inlet opening 134 is provided proximate an end of the cylinder 114 opposite the outlet chamber 126 (FIG. 4). The illustrated inlet opening 134 extends radially through the cylinder 114 and allows ambient air to flow into the cylinder 114 (for subsequent compression) at the end of the piston's return stroke.

Figure 2:
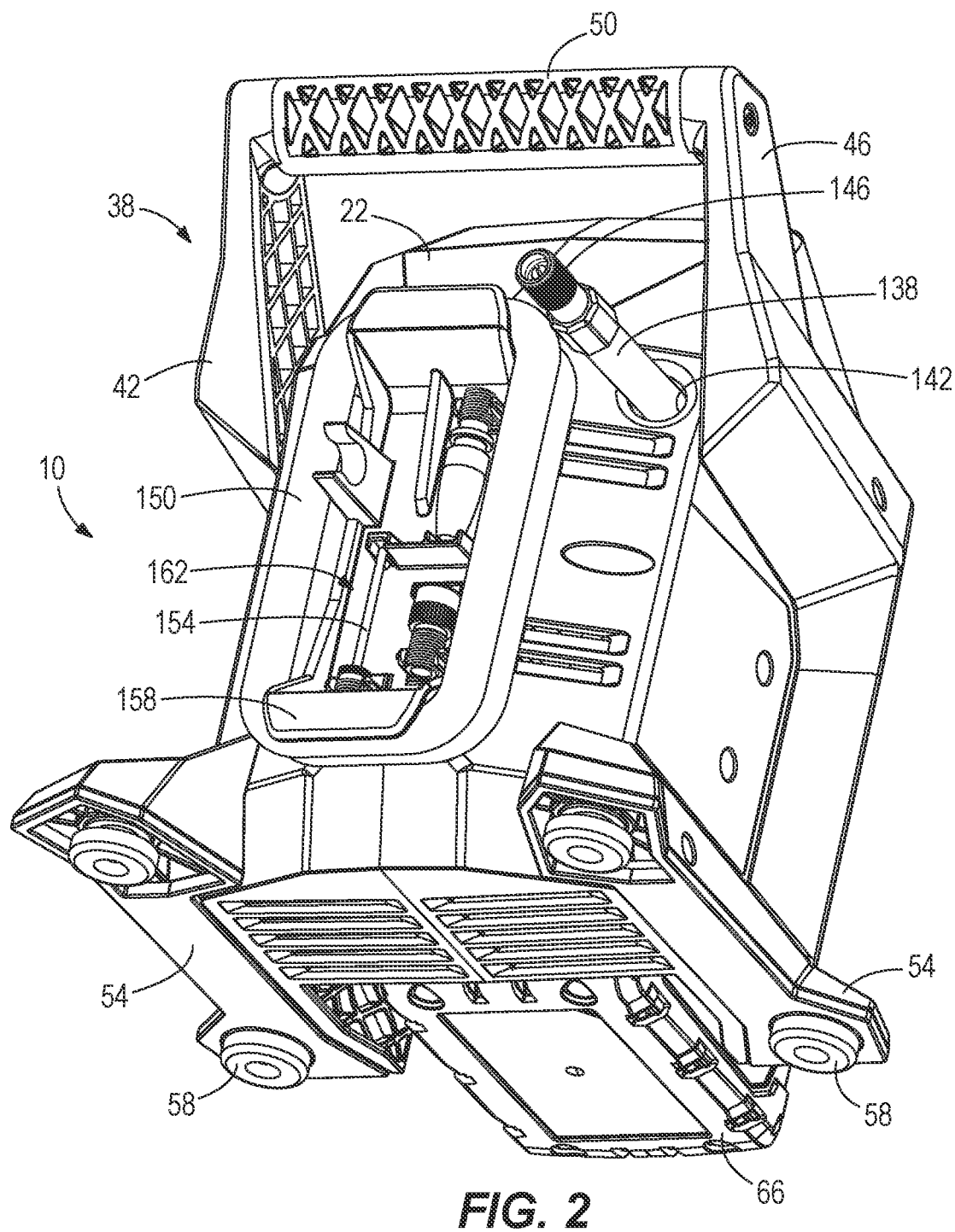
FIG. 2 is another perspective view of the inflator of FIG. 1.

With reference to FIGS. 2 and 4, an outlet hose 138 extends from the outlet chamber 126 and through an opening 142 in the rear side 22 of the housing 14. The outlet hose 138 terminates at an adapter 146. The adapter 146 may be connected to an extension hose 150, a variety of adapters 154, and the like. In the illustrated embodiment, the inflator 10 includes a hose wrap 158 with an integrated storage compartment 162 coupled to the rear side 22 of the housing 14 for storing the extension hose 150 and the adapters 154.

Figure 5:
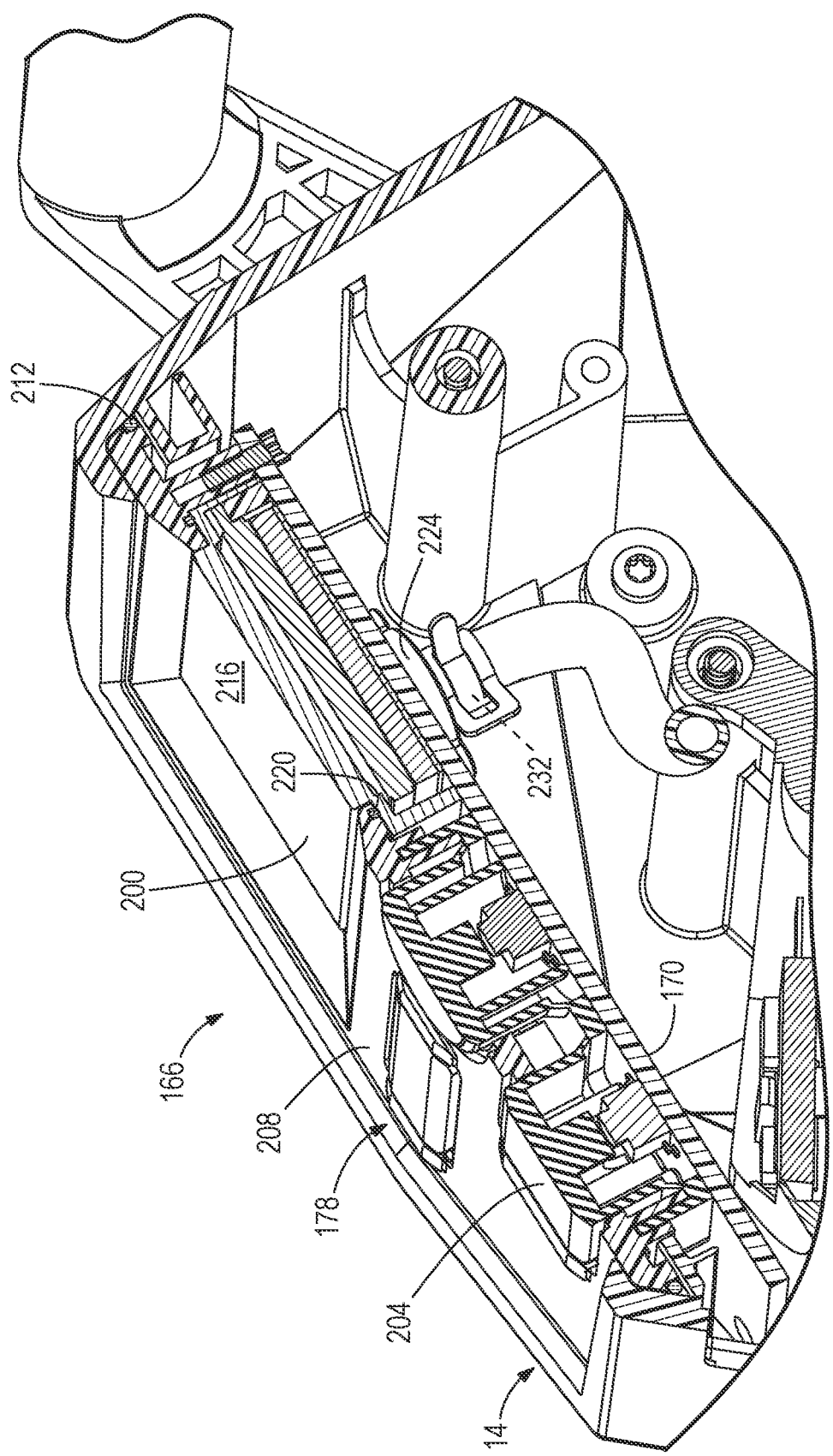
FIG. 5 is a cross-sectional view of a control module of the inflator of FIG. 1.

A control unit 166 is provided for controlling operation of the inflator 10 (FIGS. 4 and 5). The illustrated control unit 166 includes a printed circuit board 170 ("PCB") provided with a controller 174 (FIG. 6) and a user interface 178. With reference to FIG. 5, the user interface 178 includes a display 200, such as a monochromatic display, a liquid crystal diode (LCD) display, or other display that is capable of displaying alphanumeric data, and a plurality of keys or buttons 204. In the illustrated embodiment, the buttons 204 are coupled to switches 208 on the PCB 170. In other embodiments, the display 200 may be touch-sensitive, and one or more of the buttons 204 may be virtual buttons displayed on the display 200. The user can communicate with the controller 174 via the display 200 and/or the buttons 204, which allow the user to make selections from the display 200, enter data, and the like. Each button 204 may correspond with different actions shown on the display 200, allowing the user to interact with the controller 174 to turn the inflator 10 on/off, control operation of the inflator 10, etc.

The control unit 166 is disposed generally above the battery 66 and includes a cover plate 208 extending at an oblique angle relative to the front side 18 of the housing 14 (FIG. 1). A first seal 212 surrounds the cover plate 208 to provide a substantially water-tight seal between the cover plate 208 and the housing 14 (FIG. 5). In the illustrated embodiment, a lens 216 overlies the display. The lens 216 is preferably made of a transparent, impact-resistant material such as polycarbonate. A second seal 220 is disposed between the lens 216 and an underside of the cover plate 208 to provide a substantially water-tight seal between the lens 216 and the cover plate 208.

Referring to FIGS. 4 and 5, the control unit 166 further includes one or more pressure sensors 224 in communication with the controller 174. A tube 228 extends from a first fitting 232 on the pressure sensor 224 to a second fitting 236 on the outlet chamber 126. The tube 228 establishes fluid communication between the pressure sensor 224 and the outlet chamber 126 such that the pressure sensor 224 can detect the pressure within the outlet chamber 126 (and, therefore, the pressure within the object being inflated).

Figure 6:
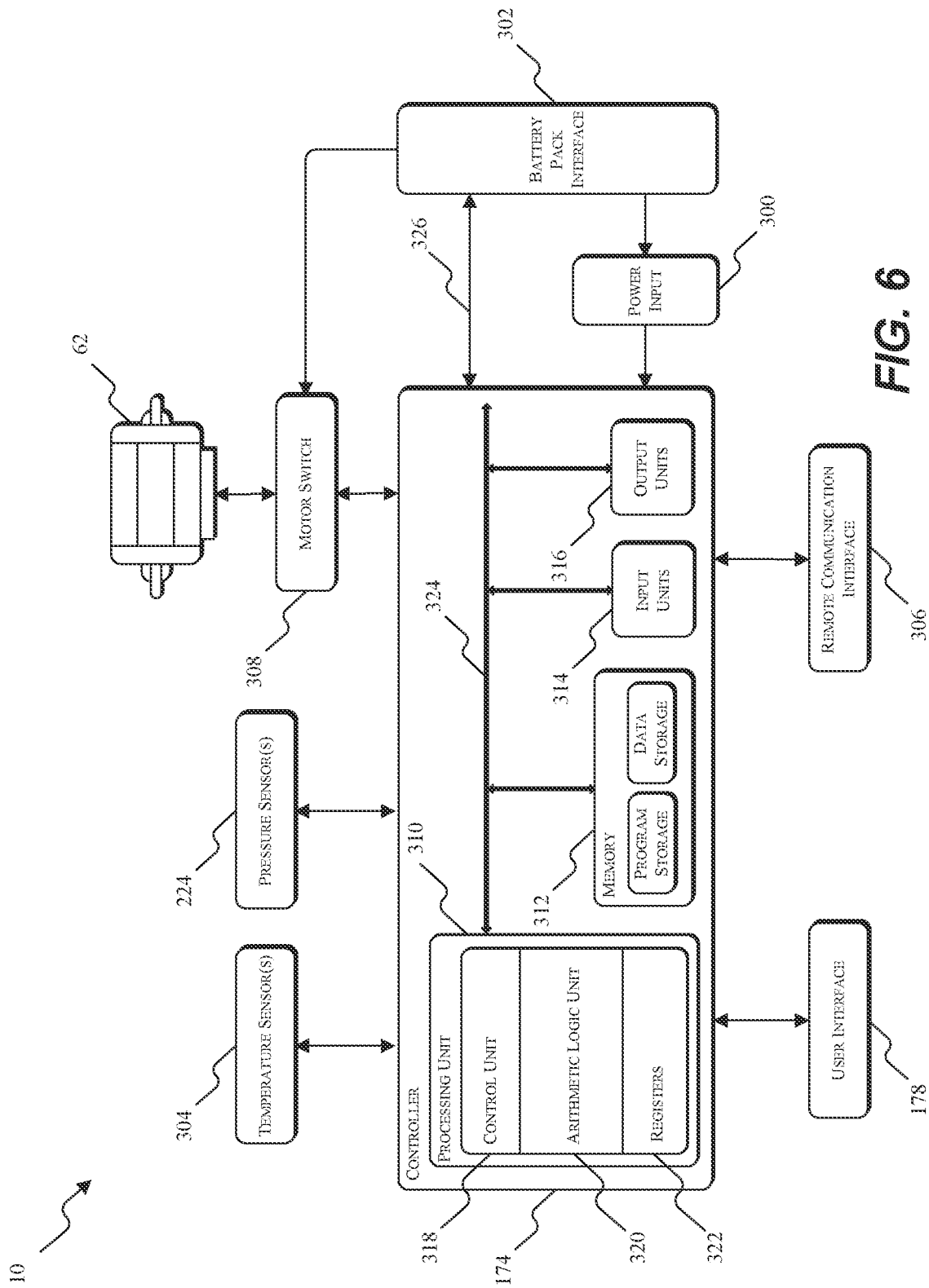
FIG. 6 illustrates a control system for the inflator of FIG. 1 according to an embodiment of the invention.

The power provided by the battery pack 66 to the inflator 10 is controlled, monitored, and regulated using control electronics within the inflator 10, as illustrated in the electromechanical diagram of FIG. 6. FIG. 6 illustrates the controller 174 associated with the inflator 10. The controller 174 is electrically and/or communicatively connected to a variety of modules or components of the inflator 10. For example, the illustrated controller 174 is connected to a power input module 300, a battery pack interface 302, one or more temperature sensors 304, the one or more pressure sensors 224, a user interface module 178, a remote communication interface 306, and a motor switching module 308 (e.g., including one or more switching FETs). The controller 174 includes combinations of hardware and software that are operable to, among other things, control the operation of the inflator 10, control the user interface 178, monitor the operation of the inflator 10, etc.

In some embodiments, the controller 174 includes a plurality of electrical and electronic components that provide power, operational control, and protection to the components and modules within the controller 174 and/or the inflator 10. For example, the controller 174 includes, among other things, a processing unit 310 (e.g., a microprocessor, a microcontroller, or another suitable programmable device), a memory 312, input units 314, and output units 316. The processing unit 310 includes, among other things, a control unit 318, an arithmetic logic unit ("ALU") 320, and a plurality of registers 322 (shown as a group of registers in FIG. 6), and is implemented using a known computer architecture, such as a modified Harvard architecture, a von Neumann architecture, etc. The processing unit 310, the memory 312, the input units 314, and the output units 316 as well as the various modules connected to the controller 174 are connected by one or more control and/or data buses (e.g., common bus 324). The control and/or data buses are shown generally in FIG. 6 for illustrative purposes. The use of one or more control and/or data buses for the interconnection between and communication among the various modules and components would be known to a person skilled in the art in view of the invention described herein.

The memory 312 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 310 is connected to the memory 312 and executes software instructions that are capable of being stored in a RAM of the memory 312 (e.g., during execution), a ROM of the memory 312 (e.g., on a generally permanent basis), or another non-transitory computer readable medium such as another memory or a disc. Software included in the implementation of the inflator 10 can be stored in the memory 312 of the controller 174. The software includes, for example, firmware, one or more applications, program data, filters, rules, one or more program modules, and other executable instructions. The controller 174 is configured to retrieve from memory and execute, among other things, instructions related to the control processes and methods described herein. In other embodiments, the controller 174 may include additional, fewer, or different components.

The battery pack interface 302 includes a combination of mechanical and electrical components configured to, and operable for, interfacing (e.g., mechanically, electrically, and communicatively connecting) the inflator 10 with the battery pack 66. For example, power provided by the battery pack 66 to the inflator 10 is provided through the battery pack interface 302 to the power input module 300. The power input module 300 includes combinations of active and passive components to regulate or control the power received from the battery pack 66 prior to power being provided to the controller 174. The battery pack interface 302 also supplies power to the motor switching module 308 to be switched by the switching FETs to selectively provide power to the motor 62. The battery pack interface 302 also includes, for example, a communication line 326 for providing a communication line or link between the controller 174 and the battery pack 66. The remote communication interface 306 (e.g., a Bluetooth, NFC, WAN, USB, Ethernet, cellular, mesh network, or similar interface) enables a user to control the user interface 178 using an external or remote device (e.g., a mobile phone or a computer; not shown) via a wired or wireless connection. In some embodiments, the remote communication interface is configured to receive a signal related to a target pressure value the inflator 10 is desired to achieve.

Figure 7A:
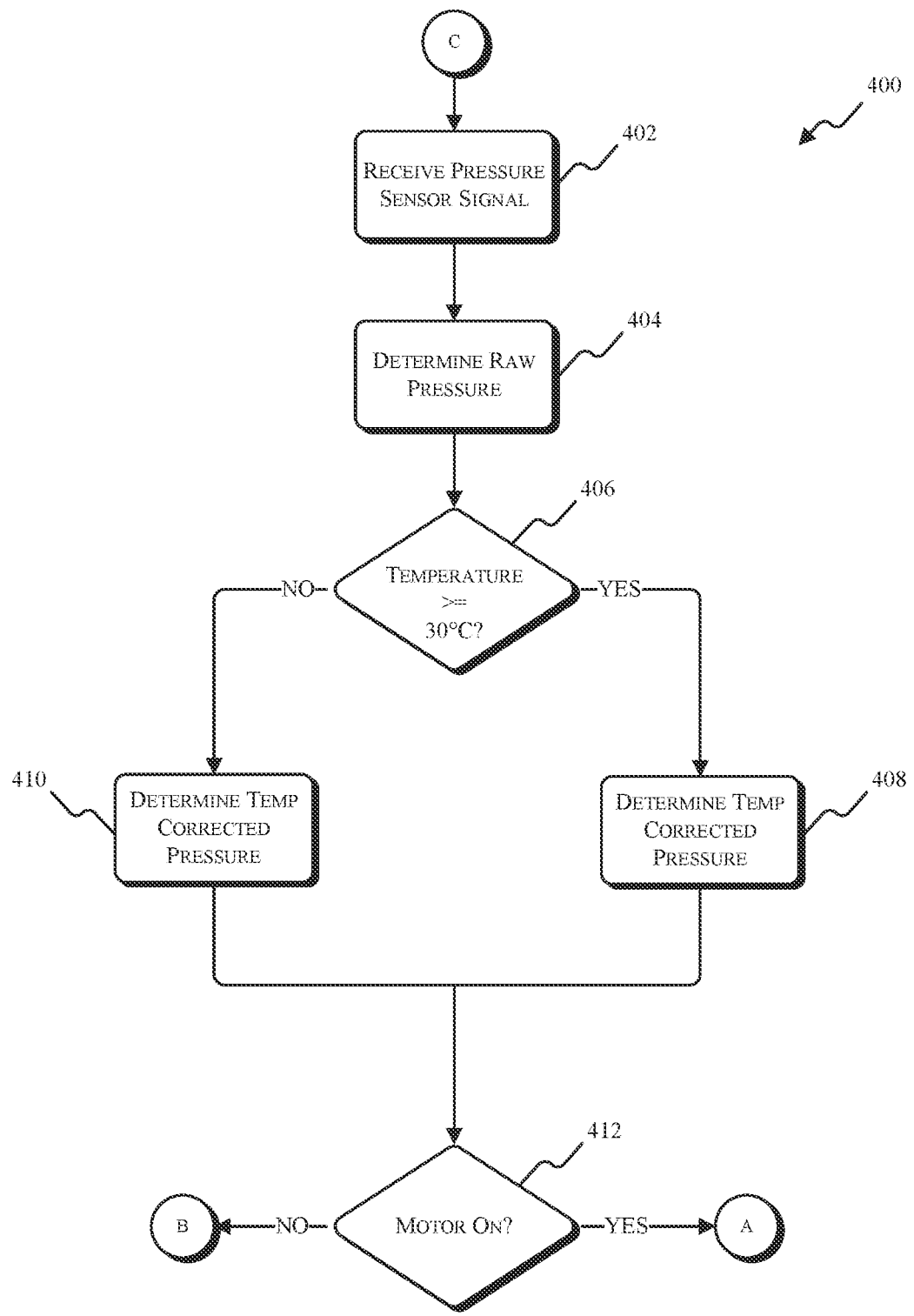
FIGS. 7A, 7B, and 7C are a process for controlling the operation of the inflator of FIG. 1.
Figure 7B:
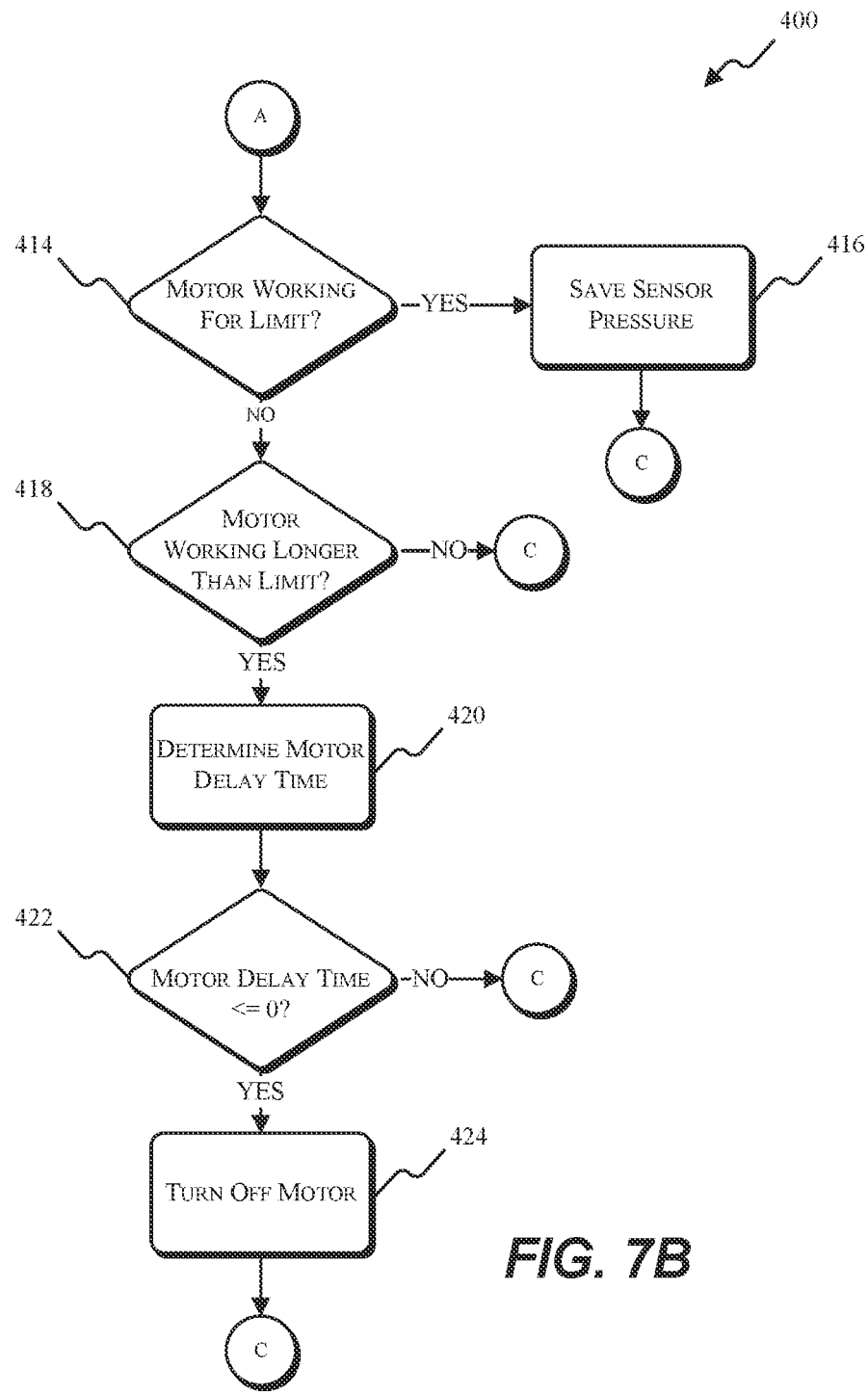
Figure 7C:
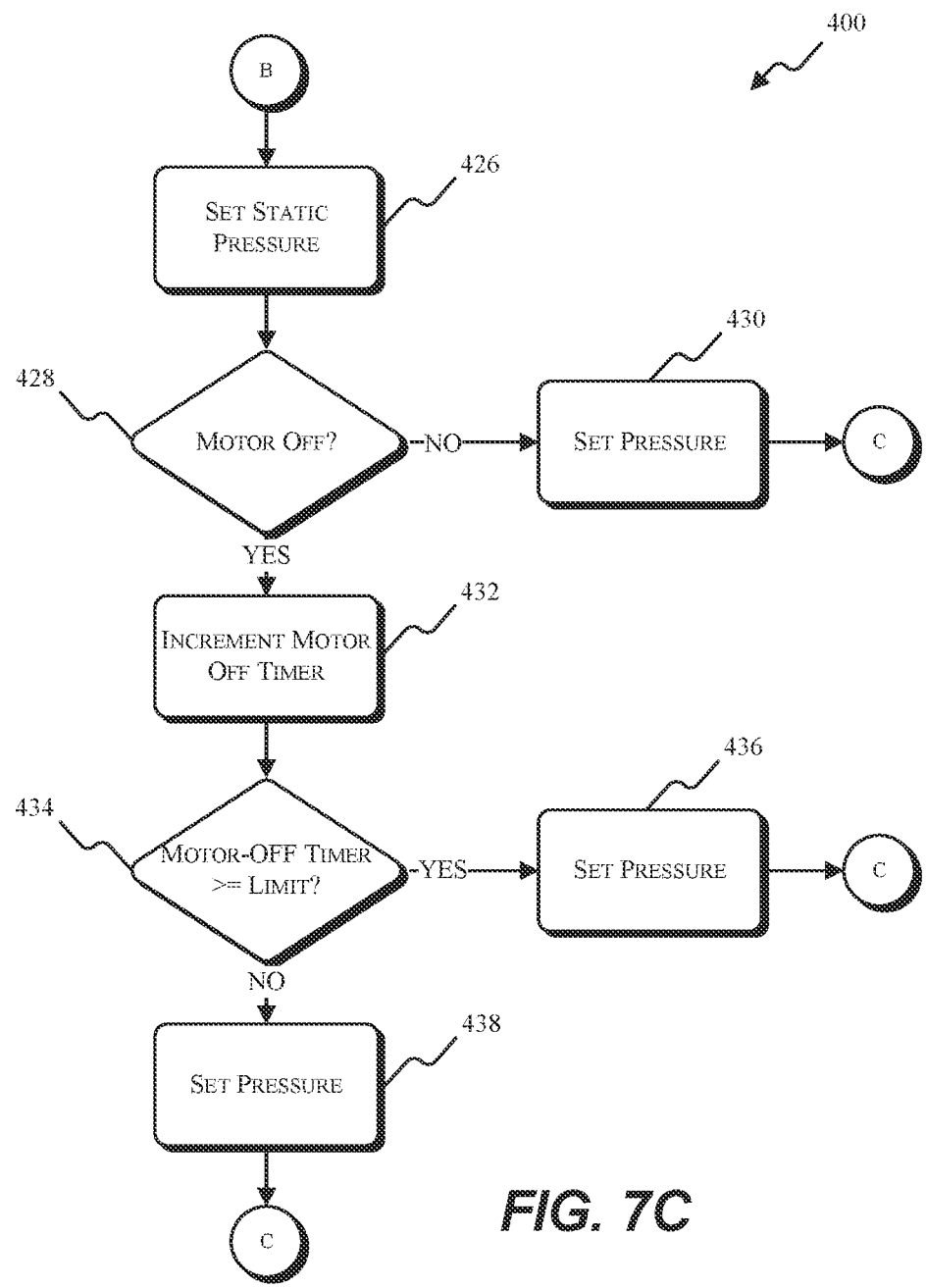

FIGS. 7A, 7B, and 7C are a process 400 for controlling the operation of the inflator 10. The process 400 begins with the controller 174 receiving a pressure sensor signal, $P_{SENSOR}$, from the pressure sensor 224 (STEP 402). The controller 174 then determines a raw pressure value (STEP 404). In some embodiments, the raw pressure, $P_{RAW}$, value is calculated as set forth below in EQN. 3:

$$P_{RAW} = P_{SENSOR} \times \text{Const\_Adjust}_A + \text{Cons\_Adjust}_B \qquad \text{EQN. 3}$$

where $\text{Const\_Adjust}_A$ and $\text{Cons\_Adjust}_B$ are constants stored in the memory 312 that are specific to the pressure sensor 224. These values are used to determine raw pressure each time a new pressure value needs to be determined based on a signal from the pressure sensor 224.

At STEP 406, the controller 174 determines whether the inflator 10 is within an environment where the temperature is greater than or equal to 30° Celsius or another prescribed temperature value. The controller 174 determines the temperature associated with the inflator's surrounding environment based on a signal received from the temperature sensor 304. No matter the outcome of STEP 406, the controller 174 determines a temperature corrected pressure, $P_{TC}$, from the raw pressure, $P_{RAW}$ (STEP 408, 410). Depending on the temperature of the inflator's environment, the temperature corrected pressure, $P_{TC}$, is calculated using different temperature offset values. For example, at STEP 408, when the temperature is greater than or equal to 30° Celsius, the temperature corrected pressure, $P_{TC}$, is calculated to compensate for any increases in pressure due to a temperature greater than or equal to 30° Celsius. At STEP 410, when the temperature is less than 30° Celsius, the temperature corrected pressure, $P_{TC}$, is calculated to compensate for any decreases in pressure due to a temperature lower than 30° Celsius. One skilled in the art would be capable of calculating the temperature corrected pressure, $P_{TC}$, based on the well-known relationship between temperature and pressure and in view of this disclosure.

Following the determination of the temperature corrected pressure, $P_{TC}$, the controller 174 determines whether the motor 62 is ON (STEP 412). If the motor 62 is ON, the process 400 proceeds to control section A shown in and described with respect to FIG. 7B. If the motor 62 is OFF, the process 400 proceeds to control section B shown in and described with respect to FIG. 7C.

With reference to control section A and FIG. 7B, the controller 174 determines whether the motor 62 has been ON and working for specified duration or time or motor-ON limit (STEP 414). The duration for which the motor 62 has been working can be determined based on a timer internal to the controller 174 and monitoring a motor-ON pin of the controller 174. When the motor 62 is turned ON, the motor-ON pin is set to ON and a motor-ON timer begins to run. Similarly, when the motor 62 is turned OFF, the motor-ON pin is set to OFF and the motor-ON timer is stopped. As a result, the controller 174 keeps track of how long the motor 62 has been running. If, at STEP 414, the motor 62 has been working for the motor-ON limit, the controller 174 stores the temperature corrected pressure, $P_{TC}$, as a previous pressure value, $P_{PREV}$ (STEP 416). In some embodiments, the motor-ON limit is 4.0 seconds. Following STEP 416, the process 400 returns to control section C shown in and described with respect to FIG. 7A so the process 400 can begin again. In some embodiments, the process 400 is executed every 0.4 seconds. If, at STEP 414, the motor 62 has not been working for the motor-ON limit, the controller 174 determines whether the motor 62 has been working for longer than the motor-ON limit (STEP 418). If, at STEP 418, the motor 62 has not been working for longer than the motor-ON limit, the process 400 returns to control section C and FIG. 7A so the process 400 can begin again. If, at STEP 418, the motor 62 has been working for longer than the motor-ON limit, the controller 174 determines a motor delay time, $T_{MD}$ (STEP 420).

The motor delay time, $T_{MD}$, corresponds to the amount of time that the motor is to be operated before a pressurization condition of the inflator 10 is terminated. The motor delay time, $T_{MD}$, is calculated based on a rate of pressurization change for sensed pressure, $R_{PC}$, and a static pressure, $P_{STATIC}$, associated with the tube 228 before a pressurization condition of the inflator 10 is initiated (described below). The rate of pressurization change, $R_{PC}$, is calculated as set forth below in EQN. 4:

$$R_{PC} = \frac{P_{TC} - P_{PREV}}{\text{Limit}} \qquad \text{EQN. 4}$$

where $P_{TC}$ is the temperature corrected pressure value from STEP 408 or STEP 410, and $P_{PREV}$ is the previous pressure value from STEP 416. In some embodiments, the rate of pressurization change, $R_{PC}$, is averaged over several iterations of its calculation. For example, the rate of pressurization can be calculated with each iteration of the process 400 (e.g., every 0.4 seconds) or each time the motor-ON limit is reached (e.g., every four seconds). No matter the interval, the controller 174 can average multiple calculations of the rate of pressurization change, $R_{PC}$. By averaging the rate of pressurization change, $R_{PC}$, the controller can limit large rate fluctuations that can result from anomalous sensor readings.

A static pressure value, $P_{STATIC}$, is then calculated. The static pressure value, $P_{STATIC}$, is regularly being updated throughout a pressurization condition of the inflator 10. The static pressure value, $P_{STATIC}$, is initially determined before the motor 62 is turned on. However, after the pressurization condition has begun, the static pressure value is updated by adding the rate of pressurization, $R_{PC}$, multiplied by the motor-ON limit (i.e., $P_{TC}-P_{PREV}$). Accordingly, the controller 174 effectively adds a delta pressure value, $\Delta P$, corresponding to the amount of pressure added during the most recent motor-ON time interval. With the static pressure value, $P_{STATIC}$, and the rate of pressurization change, $R_{PC}$, the controller 174 calculates the motor delay time, $T_{MD}$, as set forth below in EQN. 5:

$$T_{MD} = \frac{(P_{TARGET} - P_{STATIC})}{R_{PC}} \qquad \text{EQN. 5}$$

where $P_{TARGET}$ is a target pressure value set using the user interface 178. The motor delay time, $T_{MD}$, has units of seconds and gradually approaches zero as the pressurization condition of the inflator 10 progresses. After the motor delay time, $T_{MD}$, is calculated at STEP 420, the motor-ON timer described above can be reset to zero to begin counting for the next motor-ON time interval.

Following STEP 420, the controller 174 determines whether the motor delay time, $T_{MD}$, is less than or equal to zero (STEP 422). At the point when the motor delay time, $T_{MD}$, reaches zero or substantially zero (e.g., an arbitrarily close number to zero), the updated static pressure, $P_{STATIC}$, substantially equals the target pressure, $P_{TARGET}$. If, at STEP 422, the motor delay time, $T_{MD}$, is not equal to or less than zero, the process 400 returns to control section C shown in and described with respect to FIG. 7A so the process 400 can begin again. If, at STEP 422, the motor delay time, $T_{MD}$, is equal to or less than zero, the process 400 proceeds to STEP 424 where the controller 174 turns OFF the motor 62 and terminates the pressurization condition of the inflator 10 in response to the updated static pressure, $P_{STATIC}$, equaling the target pressure, $P_{TARGET}$. Following STEP 424, the process 400 returns to control section C shown in and described with respect to FIG. 7A so the process 400 can begin again.

Returning to STEP 412 and FIG. 7A, if the motor 62 is OFF, the process 400 proceeds to control section B shown in and described with respect to FIG. 7C. With reference to FIG. 7C, the static pressure value, $P_{STATIC}$, is set to the temperature compensated pressure, $P_{TC}$ (STEP 426). At STEP 428, the controller 174 determines if the motor is OFF. When the motor 62 is turned OFF, a motor-OFF pin is set to OFF. However, if the motor is not OFF (i.e., the motor has begun working), the controller 174 sets a current pressure value equal to the temperature compensated pressure, $P_{TC}$ (STEP 430). After the current pressure is set at STEP 430, the process 400 returns to control section C shown in and described with respect to FIG. 7A so the process 400 can begin again. If, at STEP 428, the motor 62 is OFF, a motor-OFF timer begins to run and is incremented at STEP 432. At STEP 434, the motor-OFF timer is compared to a motor-OFF limit (e.g., 1.25 s). If, at STEP 434, the motor-OFF timer is greater than or equal to the motor-OFF limit, the controller 174 sets a current pressure value equal to the temperature compensated pressure, $P_{TC}$, and resets the motor-OFF bit to reset the motor-OFF timer (STEP 436). After the current pressure is set at STEP 436, the process 400 returns to control section C shown in and described with respect to FIG. 7A so the process 400 can begin again.

Returning to STEP 434, if the motor-OFF timer is not greater than or equal to the motor-OFF limit, the controller 174 sets the current pressure value equal to the user desired target pressure, $P_{TARGET}$, received from the user interface 178 (STEP 438). After the current pressure is set at STEP 438, the process 400 returns to control section C shown in and described with respect to FIG. 7A so the process 400 can begin again.

Figure 8A:
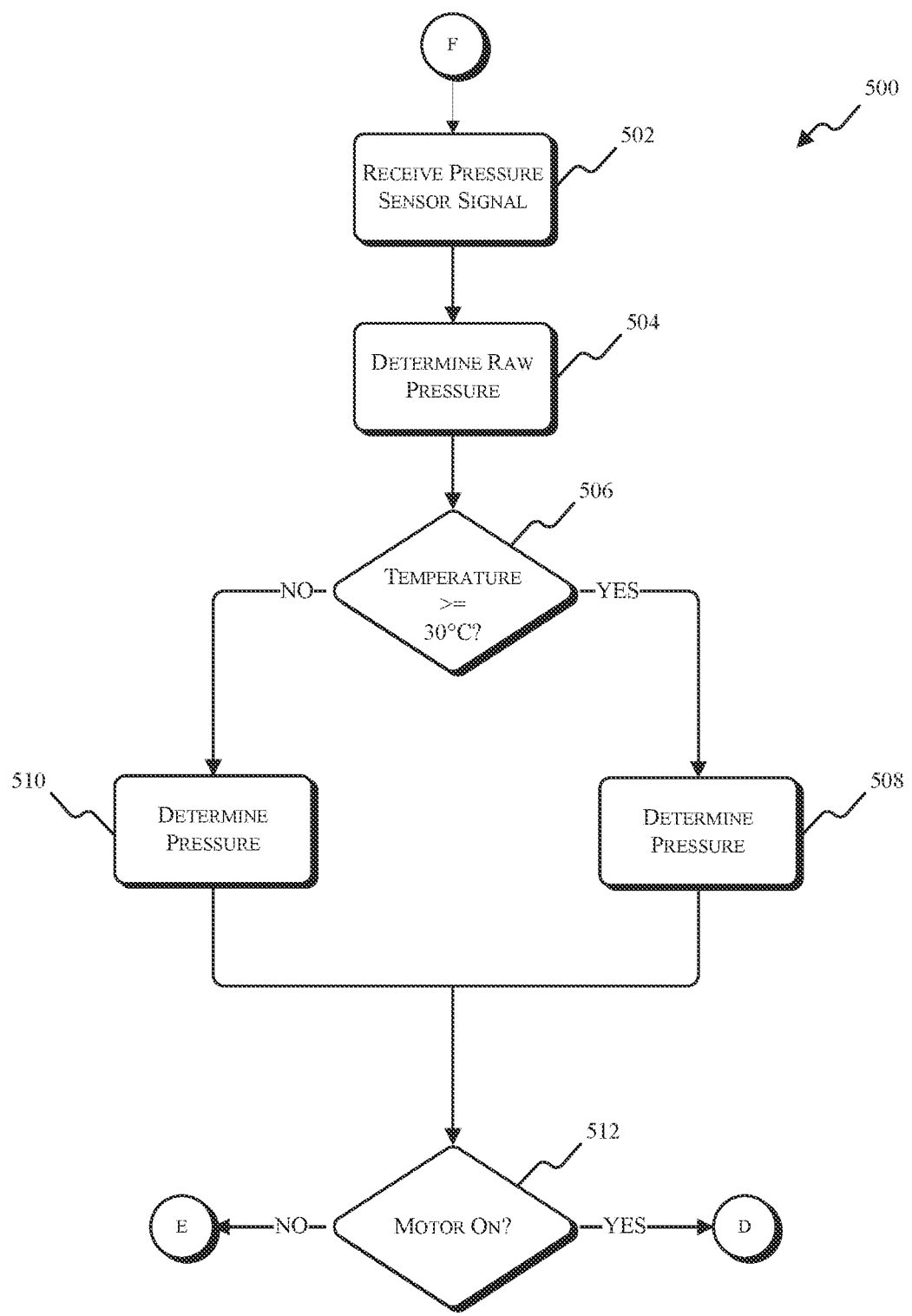
FIGS. 8A, 8B, and 8C are another process for controlling the operation of the inflator of FIG. 1.
Figure 8B:
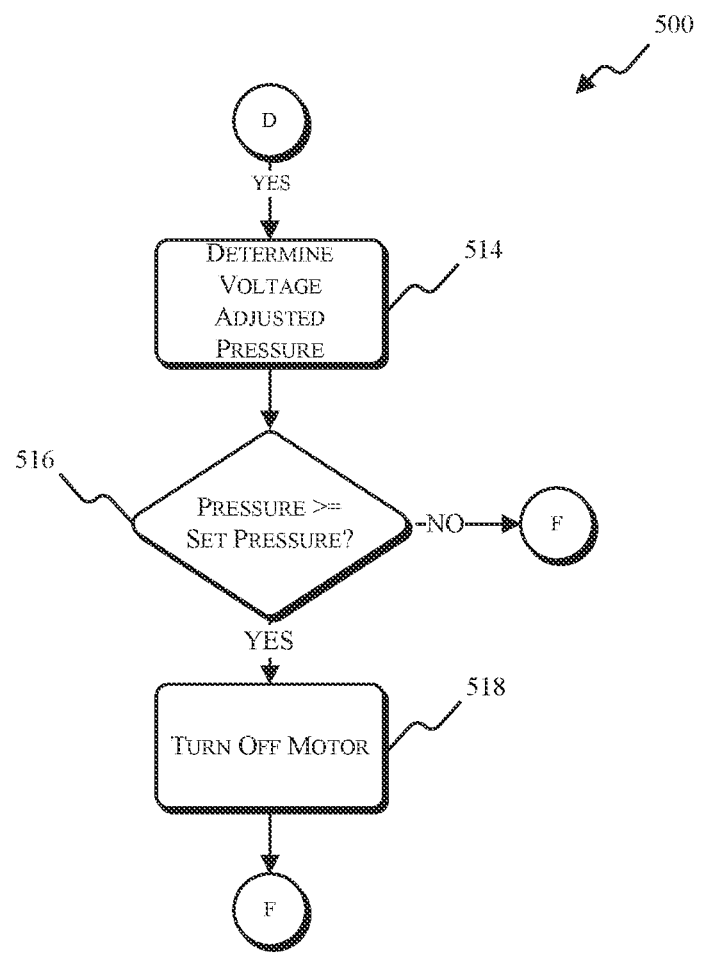
Figure 8C:
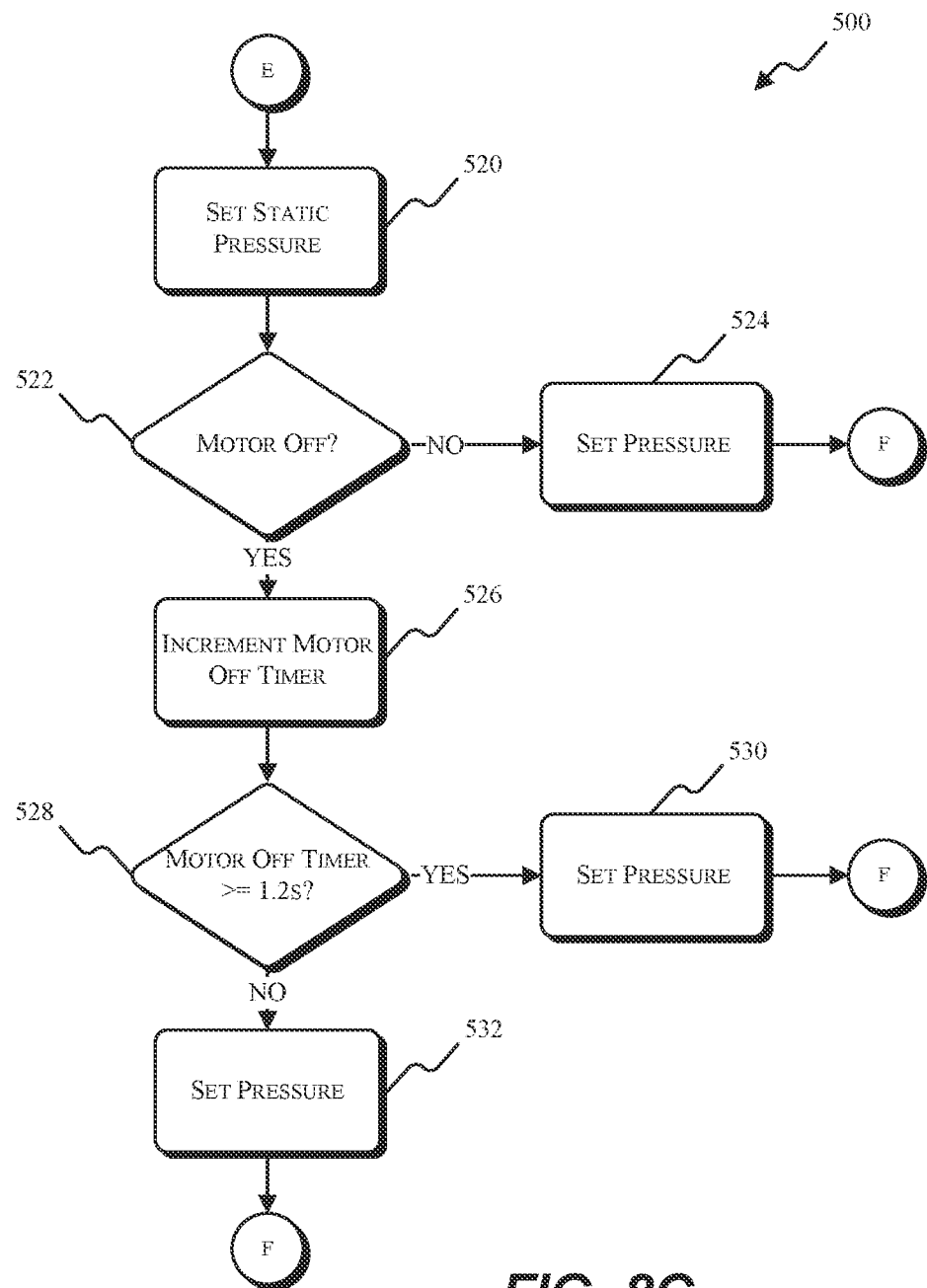

FIGS. 8A, 8B, and 8C are another process 500 for controlling the operation of the inflator 10. The process 500 differs from the process 400 in that control of the inflator is based on a battery pack voltage adjusted pressure value. The process 500 begins with the controller 174 receiving a pressure sensor signal, $P_{SENSOR}$, from the pressure sensor 224 (STEP 502). The controller 174 then determines a raw pressure value (STEP 504). In some embodiments, the raw pressure, $P_{RAW}$, value is calculated as set forth below in EQN. 6:

$$P_{RAW} = P_{SENSOR} \times \text{Const\_Adjust}_A + \text{Cons\_Adjust}_B \qquad \text{EQN. 6}$$

where $\text{Const\_Adjust}_A$ and $\text{Cons\_Adjust}_B$ are constants stored in the memory 312 that are specific to the pressure sensor 224. These values are used to determine raw pressure each time a new pressure value needs to be determined based on a signal from the pressure sensor 224.

At STEP 506, the controller 174 determines whether the inflator 10 is within an environment where the temperature is greater than or equal to 30° Celsius or another prescribed temperature value. The controller 174 determines the temperature of the inflator's surrounding environment based on a signal received from the temperature sensor 304. No matter the outcome of STEP 506, the controller 174 determines a temperature corrected pressure, $P_{TC}$, from the raw pressure, $P_{RAW}$ (STEP 508, 510). Depending on the temperature of the inflator's environment, the temperature corrected pressure, $P_{TC}$, is calculated using different temperature offset values. For example, at STEP 508, when the temperature is greater than or equal to 30° Celsius, the temperature corrected pressure, $P_{TC}$, is calculated to compensate for any increases in pressure due to a temperature greater than or equal to 30° Celsius. At STEP 510, when the temperature is less than 30° Celsius, the temperature corrected pressure, $P_{TC}$, is calculated to compensate for any decreases in pressure due to a temperature lower than 30° Celsius. One skilled in the art would be capable of calculating the temperature corrected pressure, $P_{TC}$, based on the well-known relationship between temperature and pressure.

Following the determination of the temperature corrected pressure, $P_{TC}$, the controller 174 determines whether the motor 62 is ON (STEP 512). If the motor 62 is ON, the process 500 proceeds to control section D shown in and described with respect to FIG. 8B. If the motor 62 is OFF, the process 500 proceeds to control section E shown in and described with respect to FIG. 8C.

With reference to control section D and FIG. 8B, the controller 174 determines a voltage adjusted pressure value, $P_{VA}$ (STEP 514). The voltage adjusted pressure value, $P_{VA}$, is determined as a function of the voltage of the battery pack 66. In some embodiments, the voltage adjusted pressure value, $P_{VA}$, can be calculated for any measured voltage of the battery pack 66. In other embodiments, the voltage adjusted pressure value, $P_{VA}$, is only calculated for a couple discrete voltage values (e.g., 12V and 10V) corresponding generally to "high" voltages and "low" voltages.

As an illustrative example, the temperature compensated pressure, $P_{TC}$, can be adjusted based on a 10V battery pack voltage and a 12V battery pack voltage. A 10V pressure value and a 12V pressure value can be calculated for the adjustment as set forth below in EQNS. 7 and 8:

$$P_{10V} = P_{TC} \times \text{Adjust\_Gassing}_{10A} + \text{Adjust\_Gassing}_{10B} \quad \text{EQN. 7}$$

$$P_{12V} = P_{TC} \times \text{Adjust\_Gassing}_{12A} + \text{Adjust\_Gassing}_{12B} \quad \text{EQN. 8}$$

where $\text{Adjust\_Gassing}_{10A}$, $\text{Adjust\_Gassing}_{10B}$, $\text{Adjust\_Gassing}_{12A}$, $\text{Adjust\_Gassing}_{12B}$ are constant values stored in the memory 312 related to how pressurization from the inflator 10 changes with respect to the voltage level of the battery pack 66. Generally speaking, the closer a battery pack voltage is to a nominal voltage for the battery pack 66, the closer to unity (i.e., 1) a constant scaler multiplier for voltage-based pressure adjustment will be. The voltage adjusted pressure value, $P_{VA}$, can then be calculated as set forth below in EQN. 9:

$$P_{VA} = \frac{(P_{10V} - P_{12V}) \times (V_{BP} - 12V)}{(10V - 12V)} + P_{12V} \quad \text{EQN. 9}$$

Following STEP 514, the controller 174 determines whether the voltage adjusted pressure value, $P_{VA}$, is greater than or equal to the user desired target pressure, $P_{TARGET}$ (STEP 516). If, at STEP 516, the voltage adjusted pressure value, $P_{VA}$, is not greater than or equal to the user desired target pressure, $P_{TARGET}$, the process 500 returns to control section F shown in and described with respect to FIG. 8A so the process 500 can begin again. If, at STEP 516, the voltage adjusted pressure value, $P_{VA}$, is greater than or equal to the user desired target pressure, $P_{TARGET}$, the process 500 proceeds to STEP 518 where the controller 174 turns off the motor 62 and terminates the pressurization condition of the inflator 10. Following STEP 518, the process 500 returns to control section F shown in and described with respect to FIG. 8A so the process 500 can begin again.

Returning to STEP 512 and FIG. 8A, if the motor 62 is off, the process 500 proceeds to control section E shown in and described with respect to FIG. 8C. With reference to FIG. 8C, the static pressure value, $P_{STATIC}$, is set to the temperature compensated pressure, $P_{TC}$ (STEP 520). At STEP 522, the controller 174 determines if the motor 62 is OFF. When the motor 62 is turned OFF, a motor-OFF pin is set to OFF. However, if the motor 62 is not OFF (i.e., the motor 62 has begun working), the controller 174 sets a current pressure value equal to the temperature compensated pressure, $P_{TC}$ (STEP 524). After the current pressure is set at STEP 524, the process 500 returns to control section F shown in and described with respect to FIG. 8A so the process 500 can begin again. If, at STEP 522, the motor 62 is OFF, a motor-OFF timer begins to run and is incremented at STEP 526. At STEP 528, the motor-OFF timer is compared to a motor-OFF limit (e.g., 1.25s). If, at STEP 528, the motor-OFF timer is greater than or equal to the motor-OFF limit, the controller 174 sets a current pressure value equal to the temperature compensated pressure, $P_{TC}$, and resets the motor-OFF bit to reset the motor-OFF timer (STEP 530). After the current pressure is set at STEP 530, the process 500 returns to control section F shown in and described with respect to FIG. 8A so the process 500 can begin again.

Returning to STEP 528, if the motor-OFF timer is not greater than or equal to the motor-OFF limit, the controller 174 sets the current pressure value equal to the user desired target pressure, $P_{TARGET}$, received from the user interface 178 (STEP 532). After the current pressure is set at STEP 532, the process 500 returns to control section F shown in and described with respect to FIG. 8A so the process 500 can begin again. In some embodiments, the voltage adjusted pressure technique of the process 500 can be included in and combined with the motor delay time technique of the process 400 such that measured pressure values can be adjusted for the voltage of the battery pack 66.

Figure 9A:
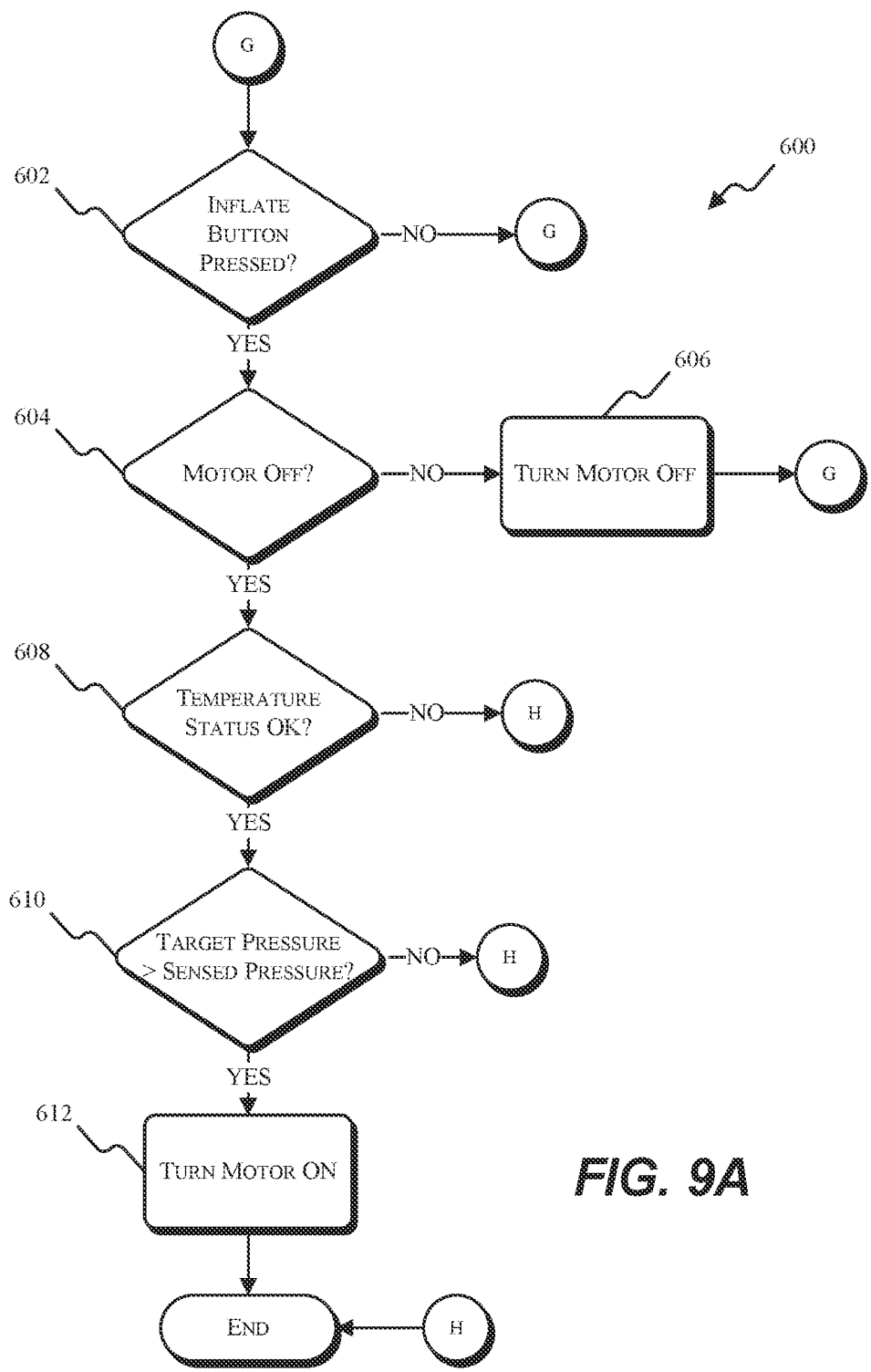
FIG. 9A is another process for controlling the operation of the inflator of FIG. 1.
Figure 9B:
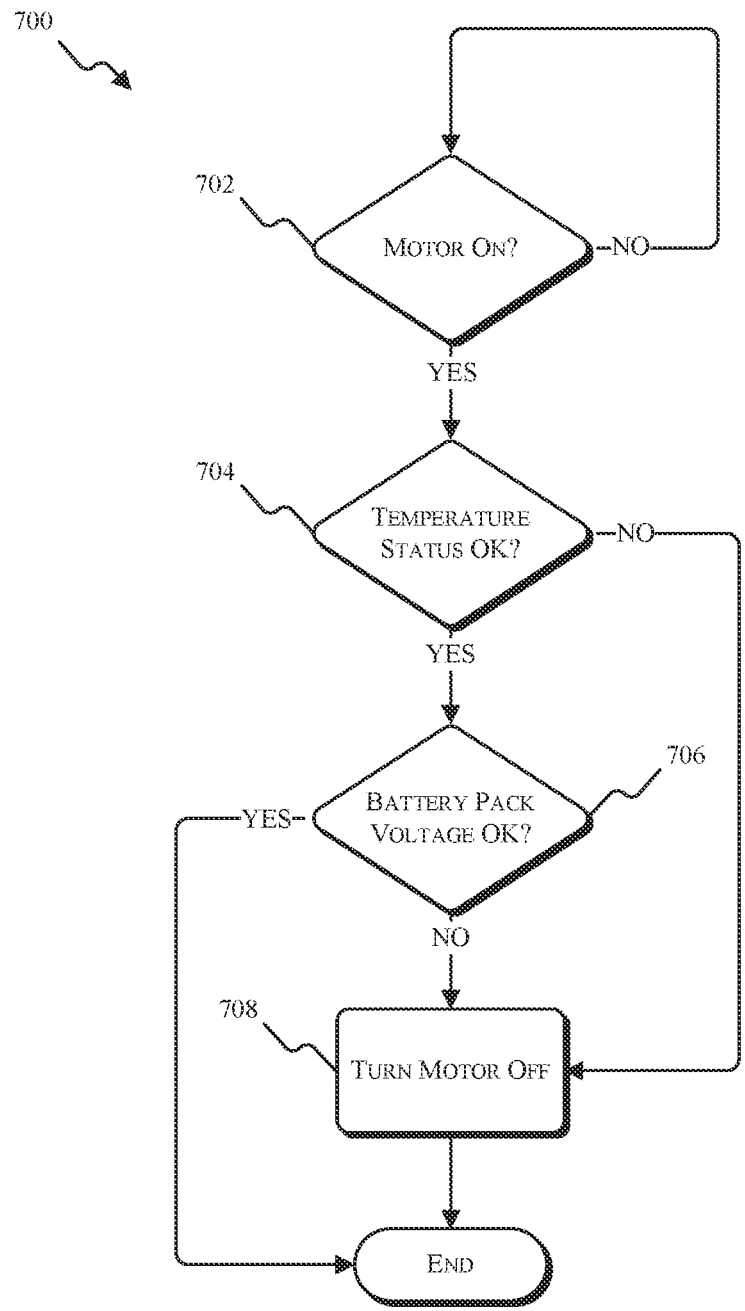
FIG. 9B is another process for controlling the operation of the inflator of FIG. 1.
Figure 9C:
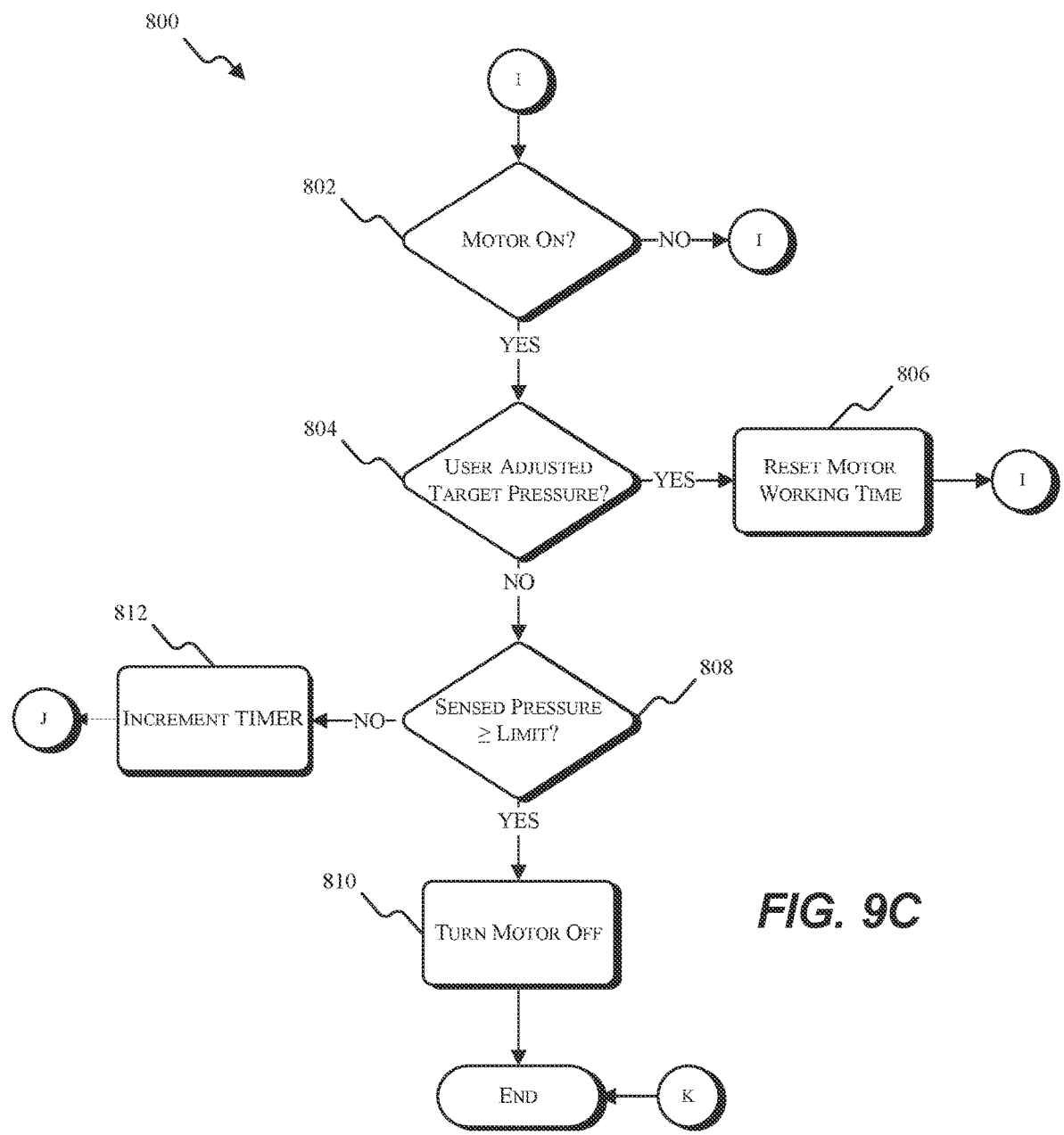
FIGS. 9C, 9D, and 9E are another process for controlling the operation of the inflator of FIG. 1.
Figure 9D:
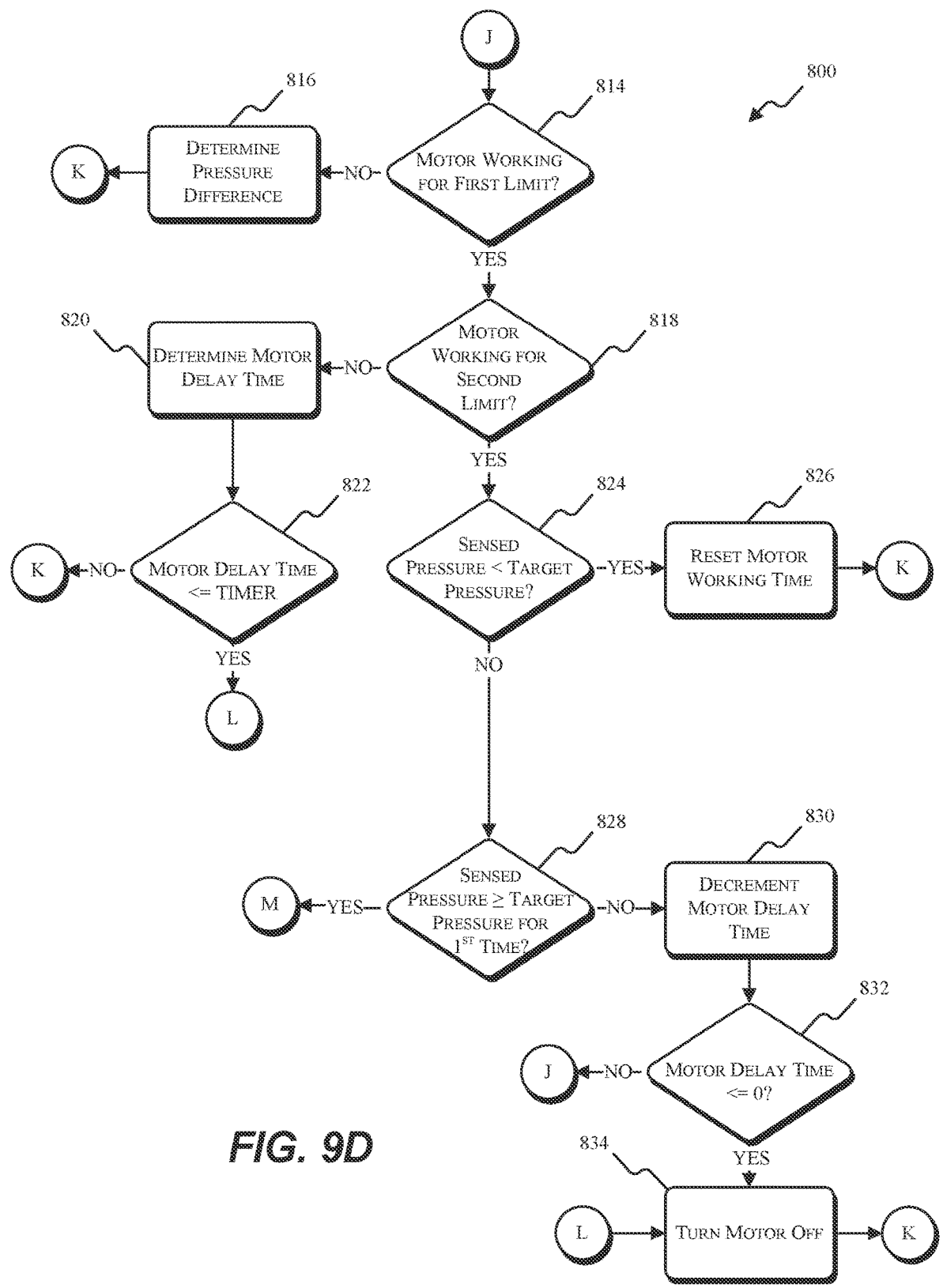

FIGS. 9A, 9B, 9C, and 9D provide another control methodology for controlling the operation of the inflator 10. The control methodology of FIGS. 9A, 9B, 9C, and 9D is divided into three discrete processes that can be executed by the controller 174 independently, sequentially, or simultaneously. FIG. 9A is a process 600 for controlling the ON/OFF operation of the motor 62 after an inflate button of the user interface 178 is pressed by a user. FIG. 9B is a process 700 for determining whether the inflator 10 can continue to be operated based on temperature fault conditions and battery pack voltage fault conditions. FIGS. 9C and 9D are a process for controlling the termination of a pressurization condition of the inflator 10.

With reference to FIG. 9A and the process 600, the process 600 begins with the controller 174 determining whether an inflate button of the user interface 178 has been pressed by a user (STEP 602). If the inflate button has not been pressed, the process 600 will return to STEP 602 until the inflate button of the user interface 178 is pressed. If, at STEP 602, the inflate button has been pressed, the controller 174 determines whether the motor 62 is OFF (STEP 604). If the motor is not OFF (i.e., motor is ON), the controller 174 turns OFF the motor 62 (STEP 606) and the process 600 returns to STEP 602. After returning to STEP 602, it is not necessary that a user press the inflate button a second time. For example, if the inflate button has been pressed within a predetermined time interval (e.g., within 5 seconds), the controller 174 can consider the inflate button to have been pressed and the controller 174 again checks to see if the motor 62 is OFF at STEP 604.

If, at STEP 604, the motor 62 is OFF, the controller 174 determines a temperature of the inflator 10 to determine whether the temperature is outside of an acceptable operational temperature range (e.g., greater than predetermined temperature value such as 50° C.). In some embodiments, the controller 174 determines the temperature of the inflator 10's surrounding environment based on a signal received from the temperature sensor 304. If the temperature of the inflator 10 is not within an acceptable operational temperature range, the process 600 ends. After the process 600 ends, the process 600 can again be executed immediately or following a delay (e.g., 2 seconds) to again check to see if the temperature of the inflator is within an acceptable operational temperature range. If, at STEP 608, the temperature of the inflator is within an acceptable operational temperature range, the controller 174 determines whether the target pressure set by a user is greater than a sensed pressure by the pressure sensor 224 (STEP 610). If the target pressure is not greater than the sensed pressure, there is no need to inflate an object and the process 600 ends. If, at STEP 610, the target pressure is greater than the sensed pressure, the controller 174 turns on the motor 62 (STEP 612) to initiate a pressurization condition of the inflator 10 and then the process 600 ends. In some embodiments, if a user has not provided a target pressure value at STEP 610, the controller 174 sets a target pressure value to a predetermined value (e.g., 120 pounds per square inch ["PSI"]).

With reference to FIG. 9B and the process 700, the process 700 begins with the controller 174 determining whether the motor 62 is ON (STEP 702). If the motor 62 is not ON (i.e., motor is OFF), the process 700 returns to STEP 702 and the controller 174 waits for the motor 62 to be turned ON. If, at STEP 702, the motor 62 is ON, the controller 174 determines a temperature of the inflator 10 to determine whether the temperature is outside of an acceptable operational temperature range (e.g., greater than predetermined temperature value such as 50° C.) (STEP 704). In some embodiments, the controller 174 determines the temperature of the inflator 10's surrounding environment based on a signal received from the temperature sensor 304. If the temperature of the inflator 10 is not within an acceptable operational temperature range, the controller 174 turns OFF the motor 62 (STEP 708). If, at STEP 704, the temperature of the inflator is within an acceptable operational temperature range, the controller 174 determines whether the voltage of the battery pack 66 is within an acceptable range (i.e., less than a high-voltage cutoff value and greater than a low-voltage cutoff value) (STEP 706). For example, certain types of battery cells used in battery packs, such as lithium-based battery cells, have prescribed upper and lower voltage cutoff values. If the battery cell or battery pack 62's voltage reaches an upper voltage limit during charging, charging can be discontinued. Alternatively, if the battery cells or battery pack 62 reach a low-voltage limit during use, the controller 174 can prevent further discharge of the battery cells or battery pack 62. If, at STEP 706, the battery pack voltage is not within an acceptable range, the controller 174 turns OFF the motor 62 (STEP 708). If the battery pack 62's voltage is within an acceptable range, the process 700 ends. After the process 700 ends, the process 700 can again be executed immediately or following a delay (e.g., 2 seconds) to again check to see if the temperature of the inflator and the voltage of the battery pack 62 are within acceptable operational ranges.

With reference to FIGS. 9C and 9D and the process 800, the process 800 begins with the controller 174 determining whether the motor 62 is ON (STEP 802). If the motor 62 is not ON (i.e., motor is OFF), the process 800 returns to STEP 802 and the controller 174 waits for the motor 62 to be turned ON. If, at STEP 802, the motor 62 is ON, the controller 174 determines whether a user has adjusted the target pressure to a new value (STEP 804). If a user adjusted the target pressure to a new value, the controller 174 will reset a motor working time variable (e.g., how long the motor 62 has been ON) (STEP 806). The controller 174 may also reset a FIRST TIME bit if a sensed pressure has previously exceeded target pressure value (described below). The process 800 then returns to STEP 802. If, at STEP 804, the user has not adjusted the target pressure to a new value, the controller 174 determines whether sensed pressure is greater than or equal to an upper pressure limit (e.g., 120 PSI) (STEP 808). If the sensed pressure is greater than or equal to the upper pressure limit, the controller 174 turns OFF the motor 62 (STEP 810) and the process 800 ends. If, at STEP 808, the sensed pressure is less than the upper pressure limit, the controller 174 increments a TIMER (STEP 812). The TIMER can be used to terminate a pressurization condition of the inflator 10. The process 800 then proceeds to control section J shown in and described with respect to FIG. 9D.

With reference to FIG. 9D and control section J of the process 800, the controller 174 determines whether the motor working time has reached a first limit (e.g., 4 seconds) (STEP 814). If, at STEP 814, the motor working time has not reached the first limit, the controller 174 determines a pressure difference, $\Delta P$, between the target pressure value and a current sensed pressure value (STEP 816). After the controller 174 determines the pressure difference at STEP 816, the process 800 returns to control section K and FIG. 9C where the process 800 ends before being re-executed. In some embodiments, the process 800 is executed once every 0.4 seconds.

If, at STEP 814, the motor working time has reached the first limit, the controller 174 determines whether the motor working time has reached a second limit (e.g., 12 seconds) (STEP 818). If the motor working time has not reached the second limit, the controller 174 determines a motor delay time, $T_{MD}$ (STEP 820). The motor delay time, $T_{MD}$, corresponds to the amount of time that the motor 62 is to be operated before a pressurization condition of the inflator 10 is terminated. The motor delay time, $T_{MD}$, is calculated based on a rate of pressurization change for sensed pressure, $R_{PC}$, and a delta pressure value, $\Delta P$, between the target pressure value and the current sensed pressure value. The rate of pressurization change, $R_{PC}$, is calculated as set forth below in EQN. 10:

$$R_{PC} = \frac{P_S - P_{SPREV}}{\text{INTERVAL}} \quad \text{EQN. 10}$$

where $P_S$ is the current sensed pressure value, $P_{SPREV}$ is the previous sensed pressure value from the previous iteration of the process 800, and INTERVAL is the interval of time between $P_S$ and $P_{SPREV}$ (e.g., 0.4 seconds, 4.0 seconds, etc.). In some embodiments, the rate of pressurization change, $R_{PC}$, is averaged over several iterations of its calculation. For example, the rate of pressurization can be calculated with every iteration of the process 800 (e.g., 0.4 second interval) or each time the motor working time reaches the first limit (e.g., 4 second interval). No matter the interval, the controller 174 can average multiple calculations of the rate of pressurization change, $R_{PC}$. By averaging the rate of pressurization change, $R_{PC}$, the controller can limit large rate fluctuations that can result from anomalous sensor readings. The motor time delay, $T_{MD}$, is determined by dividing the delta pressure value, $\Delta P$, between the target pressure value and the current sensed pressure value by the rate of pressurization change, $R_{PC}$, as shown below in EQN. 11.

$$T_{MC} = \frac{\Delta P}{R_{PC}} \qquad \text{EQN. 11}$$

After the controller 174 determines the motor delay time, $T_{MD}$, the controller 174 compares the value of the TIMER to the determined motor delay time, $T_{MD}$ (STEP 822). If the motor delay time, $T_{MD}$, is less than or equal to the TIMER, the controller 174 turns OFF the motor (STEP 838). If the motor delay time, $T_{MD}$, is greater than the TIMER, the process 800 returns to control section K and FIG. 9C where the process 800 ends before being re-executed.

Returning to STEP 818, if the motor working time has reached the second limit, the controller 174 determines whether the current sensed pressure is less than the target pressure value (STEP 824). In some embodiments, the current sensed pressure is compared to a value less than a user-set target pressure. For example, the current sensed pressure can be compared to the user-set target pressure minus a preset value (e.g., minus a value between 0.1 PSI and 5.0 PSI). If, at STEP 824, the sensed pressure is less than the target pressure, the motor working time is reset to zero and the process 800 returns to control section K and FIG. 9C where the process 800 ends before being re-executed. If, at STEP 824, the current sensed pressure is greater than or equal to the target pressure, the controller 174 determines whether the current sensed pressure is greater than or equal to the target pressure for the first time (STEP 828). If the current sensed pressure is greater than or equal to the target pressure for the first time, the process 800 proceeds to control section M shown in and described with respect to FIG. 9E.

If, at STEP 828, the current sensed pressure is greater than or equal to the target pressure for a second or subsequent iteration of the process 800, the controller 800 decrements the motor delay time (STEP 830). After decrementing the motor delay time, $T_{MD}$, the controller 174 compares the value of the motor delay time, $T_{MD}$, to zero (STEP 832). If the motor delay time, $T_{MD}$, is less than or equal to zero, the controller 174 turns OFF the motor (STEP 834) and the process 800 returns to control section K and FIG. 9C where the process 800 ends. If the motor delay time, $T_{MD}$, is greater than zero, the process 800 returns to control section J and STEP 814.

Figure 9E:
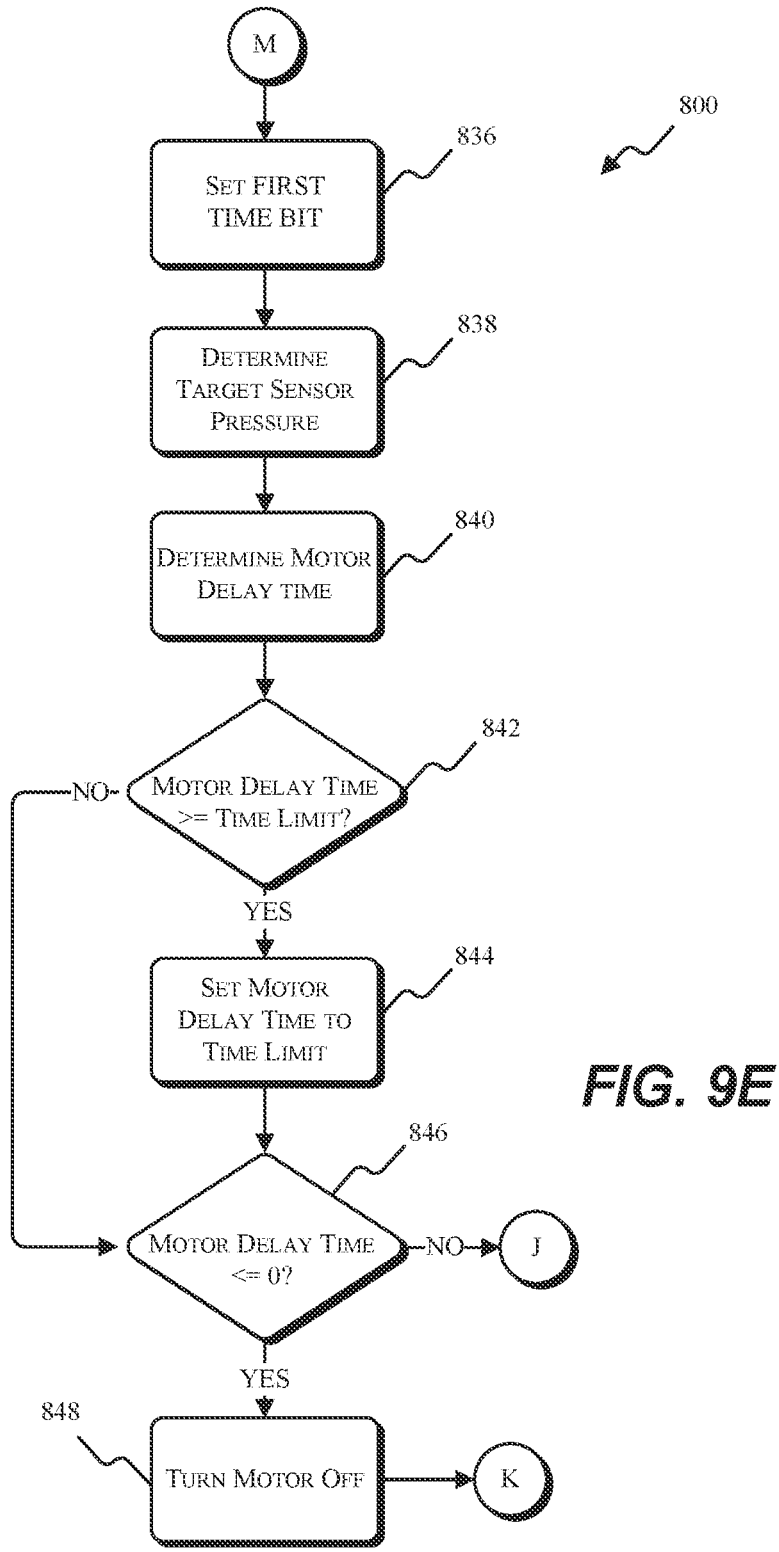

With reference to control section M and FIG. 9E, the controller 174 has determined that the current sensed pressure was greater than or equal to the target pressure for the first time. The controller 174 then sets a FIRST TIME BIT to indicate that this is the first instance of the current sensed pressure being greater than or equal to the target pressure (STEP 836). Following STEP 836, the controller 174 determines a target sensor pressure (STEP 838). The target sensor pressure differs from the user-set target pressure because it is compensated for a drop off value related to the voltage of the battery pack 66. The drop off value compensates the user-set target pressure based on the reduced effectiveness of the battery pack 66 to power the inflator as its voltage decreases. As battery pack voltage decreases, the inflator 10 does not provide pressurized air at the same rate as when the battery pack 66 is fully-charged. Additionally, the higher the target PSI for an object being inflated, the more quickly the battery pack 66's voltage is depleted. For example, the battery pack voltage drop off value can be empirically predetermined based on the user-set target pressure and a current voltage of the battery pack 66. Depending upon the current voltage of the battery pack 66 (e.g., 12V, 10V, etc.) and the user-set target pressure, the controller 174 retrieves the predetermined drop off value from the memory 312 for compensating the user-set target pressure. Generally, the lower the battery pack 66's voltage and the higher the user-set target pressure, the greater the battery pack voltage drop off value.

After the target sensor pressure is determined at STEP 838, the controller 174 determines a new motor delay time, $T_{MD}$ (STEP 840). The motor delay time, $T_{MD}$, corresponds to the amount of time that the motor 62 is to be operated before a pressurization condition of the inflator 10 is terminated. The controller 174 terminates a pressurization condition when the motor time delay, $T_{MD}$, equals zero (i.e., has been successively decremented to a value less than or equal to zero). The motor delay time, $T_{MD}$, is calculated as set forth above in EQN. 11. After the controller 174 determines the motor delay time, $T_{MD}$, the controller 174 determines whether the motor time delay, $T_{MD}$, is greater than or equal to a time limit (e.g., approximately 100 seconds) (STEP 842). If, at STEP 842, the motor time delay, $T_{MD}$, is greater than or equal to the time limit, the controller 174 sets the motor time delay, $T_{MD}$, to the value of the time limit (STEP 844). Following STEP 844, the controller 174 determines whether the motor time delay, $T_{MD}$, is less than or equal to zero (STEP 846). If the motor time delay, $T_{MD}$, is less than or equal to zero, the controller 174 turns OFF the motor (STEP 848) and the process 800 returns to control section K and FIG. 9C where the process 800 ends. If, at STEP 842, the motor time delay, $T_{MD}$, is less than the time limit, the controller 174 determines whether the motor time delay, $T_{MD}$, is less than or equal to zero (STEP 846). If the motor time delay, $T_{MD}$, is less than or equal to zero, the controller 174 turns OFF the motor (STEP 848) and the process 800 returns to control section K and FIG. 9C where the process 800 ends. If, at STEP 846, the motor time delay, $T_{MD}$, is greater than zero, the process 800 returns to control section J and STEP 814.

Various features and advantages of the invention are set forth in the following claims.

What is claimed is:

1. An inflator comprising:
   an inflator housing;
   a pressure sensor operable to generate a pressure signal related to an outlet pressure of the inflator;
   a motor within the inflator housing;
   a battery pack removably coupleable to the inflator housing; and a controller electrically coupled to the motor and the battery pack, the controller including a non-transitory computer readable medium and a processor, the controller comprising computer executable instructions stored in the computer readable medium for controlling operation of the inflator to:
receive the pressure signal from the pressure sensor,
determine a rate of pressurization change based on the pressure signal,
determine a static pressure value based on the rate of pressurization change,
determine a motor time delay for a timer based on a target pressure value, the static pressure value, and the rate of pressurization change,
decrement the motor time delay for the timer, and
generate a control signal when the motor time delay for the timer substantially equals zero,
wherein the control signal is operable to cause power to the motor to be turned off to stop a pressurization condition of the inflator.

2. The inflator of claim 1, wherein the motor time delay substantially equals zero when the static pressure value substantially equals the target pressure value.

3. The inflator of claim 1, further comprising a user interface including at least one button for receiving an input related to the target pressure value.

4. The inflator of claim 3, further comprising a remote communication interface for receiving the input related to the target pressure value from a remote device.

5. The inflator of claim 4, wherein the remote device is a mobile phone.

6. The inflator of claim 1, wherein the controller further comprises computer executable instructions stored in the computer readable medium for controlling operation of the inflator to:
compensate the pressure signal from the pressure sensor based on a measured temperature associated with inflator.

7. The inflator of claim 6, wherein the controller further comprises computer executable instructions stored in the computer readable medium for controlling operation of the inflator to:
determine whether the inflator is within an environment where the temperature is greater than or equal a temperature value.

8. The inflator of claim 7, wherein the controller further comprises computer executable instructions stored in the computer readable medium for controlling operation of the inflator to:
compensate the pressure signal based on a first temperature offset when the inflator is within an environment where the temperature is greater than or equal the temperature value, and
compensate the pressure signal based on a second temperature offset when the inflator is within an environment where the temperature is less than the temperature value.

9. The inflator of claim 1, wherein the controller further comprises computer executable instructions stored in the computer readable medium for controlling operation of the inflator to:
determine the motor delay time based on the following equation:

$$T_{MD} = \frac{(P_{TARGET} - P_{STATIC})}{R_{PC}}$$

where $P_{STATIC}$ is the static pressure value, $P_{TARGET}$ is the target pressure value, and $R_{PC}$ is the rate of pressurization change.

10. The inflator of claim 1, wherein the controller further comprises computer executable instructions stored in the computer readable medium for controlling operation of the inflator to:
adjust the pressure signal based on a voltage of the battery pack.

11. A computer-implemented method of controlling an inflator, the inflator including a processor, a pressure sensor, a motor, and a battery pack, the method comprising:
receiving a pressure signal from the pressure sensor related to an outlet pressure of the inflator;
determining a rate of pressurization change based on the pressure signal;
determining a static pressure value based on the rate of pressurization change;
determining a motor time delay for a timer based on a target pressure value, the static pressure value, and the rate of pressurization change;
decrementing the motor time delay for the timer; and
generating a control signal when the motor time delay for the timer substantially equals zero to cause power from the battery pack to the motor to be turned off to stop a pressurization condition of the inflator.

12. The computer-implemented method of claim 11, wherein the motor time delay substantially equals zero when the static pressure value substantially equals the target pressure value.

13. The computer-implemented method of claim 11, further comprising receiving an input through a user interface related to the target pressure value.

14. The computer-implemented method of claim 13, further comprising receiving, at a remote communication interface, the input related to the target pressure value from a remote device.

15. The computer-implemented method of claim 14, wherein the remote device is a mobile phone.

16. The computer-implemented method of claim 11, further comprising compensating the pressure signal from the pressure sensor based on a measured temperature associated with the inflator.

17. The computer-implemented method of claim 16, further comprising determining whether the inflator is within an environment where the temperature is greater than or equal a temperature value.

18. The computer-implemented method of claim 17, further comprising
compensating the pressure signal based on a first temperature offset when the inflator is within an environment where the temperature is greater than or equal the temperature value, and
compensating the pressure signal based on a second temperature offset when the inflator is within an environment where the temperature is less than the temperature value.

19. The computer-implemented method of claim 11, further comprising determining the motor delay time, $T_{MD}$, based on the following equation:

$$T_{MD} = \frac{(P_{TARGET} - P_{STATIC})}{R_{PC}}$$

where $P_{STATIC}$ is the static pressure value, $P_{TARGET}$ is the target pressure value, and $R_{PC}$ is the rate of pressurization change.

20. The computer-implemented method of claim 11, further comprising adjusting the pressure signal based on a voltage of the battery pack.

* * * * *